US011718181B2

(12) United States Patent
Yamamoto et al.

(10) Patent No.: US 11,718,181 B2
(45) Date of Patent: Aug. 8, 2023

(54) BRAKING CONTROL DEVICE FOR VEHICLE

(71) Applicant: ADVICS CO., LTD., Kariya (JP)

(72) Inventors: Takayuki Yamamoto, Nagakute (JP); Hiroyuki Kodama, Kariya (JP); Hiroyuki Ando, Nagoya (JP)

(73) Assignee: ADVICS CO., LTD., Kariya (JP)

(*) Notice: Subject to any disclaimer, the term of this patent is extended or adjusted under 35 U.S.C. 154(b) by 415 days.

(21) Appl. No.: 16/967,432

(22) PCT Filed: Feb. 5, 2019

(86) PCT No.: PCT/JP2019/003932
§ 371 (c)(1),
(2) Date: Aug. 5, 2020

(87) PCT Pub. No.: WO2019/156035
PCT Pub. Date: Aug. 15, 2019

(65) Prior Publication Data
US 2021/0213835 A1 Jul. 15, 2021

(30) Foreign Application Priority Data
Feb. 9, 2018 (JP) ................ 2018-021735

(51) Int. Cl.
B60L 7/26 (2006.01)
B60T 1/10 (2006.01)
(Continued)

(52) U.S. Cl.
CPC .............. B60L 7/26 (2013.01); B60T 1/10 (2013.01); B60W 30/18127 (2013.01);
(Continued)

(58) Field of Classification Search
CPC .... B60T 1/10; B60T 13/586; B60T 2270/604; B60T 2270/608; B60L 7/26; B60L 15/2009; B60W 30/18127
See application file for complete search history.

(56) References Cited

U.S. PATENT DOCUMENTS 4,962,969 A * 10/1990 Davis .................. B60W 10/184
303/3
5,253,929 A * 10/1993 Ohori ..................... B60T 7/042
303/3

(Continued)

FOREIGN PATENT DOCUMENTS

EP 2754592 A2 * 7/2014 ............ B60T 8/4072
JP 2004328884 A * 11/2004
(Continued)

OTHER PUBLICATIONS

International Search Report (with English Translation) and Written Opinion issued in corresponding International Patent Application No. PCT/JP2019/003932, 7 pages (dated May 14, 2019).

Primary Examiner — David A Testardi
(74) Attorney, Agent, or Firm — Buchanan Ingersoll & Rooney PC

(57) ABSTRACT

A vehicle includes a regenerative generator on a front wheel. A braking control device includes an actuator that applies a front wheel torque and a rear wheel torque, and a controller that individually adjusts the front wheel torque and the rear wheel torque. The controller is configured to determine the front wheel torque and the rear wheel torque to zero when a regenerative braking force Fg generated by the regenerative generator has not reached a maximum regenerative force Fx which is a generatable maximum value. On the other hand, the controller is configured to increase the rear wheel torque from zero before increasing the front wheel (Continued)

torque from zero when the regenerative braking force Fg reaches the maximum regenerative force Fx.

2 Claims, 7 Drawing Sheets

(51) Int. Cl.
*B60W 30/18* (2012.01)
*B60T 13/58* (2006.01)

(52) U.S. Cl.
CPC ....... *B60L 2240/463* (2013.01); *B60T 13/586* (2013.01); *B60T 2270/604* (2013.01); *B60T 2270/608* (2013.01)

(56) References Cited

U.S. PATENT DOCUMENTS

| | | | | |
|---|---|---|---|---|
| 5,326,158 | A * | 7/1994 | Ohori | B60L 7/14 303/3 |
| 5,378,053 | A * | 1/1995 | Patient | B60W 10/184 303/3 |
| 5,399,000 | A * | 3/1995 | Aoki | B60L 7/26 303/3 |
| 5,895,100 | A * | 4/1999 | Ito | B60T 13/586 303/3 |
| 6,086,166 | A * | 7/2000 | Fukasawa | B60T 8/17636 303/122.04 |
| 6,406,105 | B1 * | 6/2002 | Shimada | B60L 7/26 303/152 |
| 7,311,163 | B2 * | 12/2007 | Oliver | B60W 10/08 180/165 |
| 8,186,773 | B2 * | 5/2012 | Jaeger | B60L 7/22 303/3 |
| 2004/0054450 | A1 * | 3/2004 | Nakamura | B60T 8/00 701/22 |
| 2006/0125317 | A1 * | 6/2006 | Kokubo | B60K 6/445 303/DIG. 1 |
| 2006/0131956 | A1 * | 6/2006 | Matsuura | B60T 8/3655 303/152 |
| 2007/0018499 | A1 * | 1/2007 | Kokubo | B60L 7/14 303/151 |
| 2007/0029874 | A1 * | 2/2007 | Finch | B60T 1/10 303/152 |
| 2008/0100129 | A1 * | 5/2008 | Lubbers | B60W 10/184 303/113.1 |
| 2008/0228367 | A1 * | 9/2008 | Aoki | B60T 8/3655 701/70 |
| 2010/0105520 | A1 * | 4/2010 | Ohbayashi | B60W 10/184 477/23 |
| 2011/0278913 | A1 * | 11/2011 | Kim | B60L 3/108 303/3 |
| 2012/0022735 | A1 * | 1/2012 | Tashiro | B60L 7/18 701/22 |
| 2013/0002008 | A1 * | 1/2013 | Matsuoka | B60T 13/146 303/3 |
| 2013/0134767 | A1 * | 5/2013 | Hakiai | B60W 10/08 303/3 |
| 2014/0131150 | A1 | 5/2014 | Nimura et al. | |
| 2015/0038296 | A1 * | 2/2015 | Toyota | B60K 6/387 477/92 |
| 2015/0048670 | A1 * | 2/2015 | Nagakura | B60T 13/686 303/3 |
| 2015/0123456 | A1 | 5/2015 | Sato et al. | |
| 2015/0202965 | A1 * | 7/2015 | Gabor | B60L 7/18 701/70 |
| 2015/0353064 | A1 * | 12/2015 | Spoeri | B60T 13/686 303/3 |
| 2019/0061532 | A1 | 2/2019 | Maruyama et al. | |
| 2019/0193571 | A1 * | 6/2019 | Wein | B60L 7/18 |
| 2020/0017082 | A1 * | 1/2020 | Takahashi | B60T 13/586 |
| 2020/0189398 | A1 * | 6/2020 | Suzuki | B60T 8/1766 |
| 2021/0114464 | A1 * | 4/2021 | Carbone | B60L 7/18 |
| 2023/0016413 | A1 * | 1/2023 | Leiber | B60T 8/326 |

FOREIGN PATENT DOCUMENTS

| | | |
|---|---|---|
| JP | 2013230800 A | 11/2013 |
| JP | 2014-230457 A | 12/2014 |
| JP | 2017-154721 A | 9/2017 |
| WO | 2013008298 A1 | 1/2013 |

* cited by examiner

BRAKING CONTROL DEVICE FOR VEHICLE

TECHNICAL FIELD

The present invention relates to a braking control device for a vehicle.

BACKGROUND ART

Patent Literature 1 describes that, for the purpose of "realizing regenerative coordination control capable of exhibiting high braking performance by optimizing the upstream brake pressure by the master cylinder and the downstream brake pressure by the brake actuator according to the state of the vehicle", "the vehicle includes a brake device that applies a braking force by a brake liquid pressure with respect to each wheel, a master cylinder that generates a common brake upstream pressure with respect to each brake device, a brake actuator that generates a brake downstream pressure individually with respect to each brake device, and a motor that performs regenerative braking on the front wheels. At the time of regenerative braking by the motor, the brake ECU controls the brake upstream pressure and the brake downstream pressure so as to decrease the brake downstream pressure for each brake device corresponding to the front wheels to below the brake upstream pressure, and increase the brake downstream pressure for each brake device corresponding to the rear wheels to above the brake upstream pressure".

Specifically, the literature describes that "the brake control device includes a target braking force distribution calculation unit that distributes a target braking force to driving wheels and non-driving wheels, and calculates a target braking force for the driving wheels and a target braking force for the non-driving wheels. The target braking force distribution calculation unit predicts the stability of the vehicle at the time of braking, and changes the distribution of the target braking force for the driving wheels and the non-driving wheels based on the prediction result."

When the target braking force (also referred to as "required braking force") is distributed to the front and rear wheels of the vehicle, in addition to determining the distribution ratio, it is important that the determined distribution ratio be achieved quickly. In other words, it is desired that the kinetic energy of the vehicle is regenerated to the maximum, and when necessary, the desired braking force distribution is immediately achieved so that the stability of the vehicle can be ensured, and both the vehicle stability at the time of braking and the regenerative energy amount can be achieved.

CITATIONS LIST

Patent Literature

Patent Literature 1: Japanese Unexamined Patent Publication No. 2013-230800

SUMMARY OF INVENTION

Technical Problems

An object of the present invention is to provide a braking control device capable of achieving both the vehicle stability at the time of braking and the regenerative energy amount in a vehicle provided with an energy regeneration device.

SOLUTIONS TO PROBLEMS

The present invention relates to a vehicle in which a regenerative generator (GN) is provided on a front wheel (WHf). A braking control device for a vehicle according to the present invention includes an actuator (YU) that applies a front wheel torque (Tqf) that causes the front wheel (WHf) to generate a front wheel friction braking force (Fmf) and a rear wheel torque (Tqr) that causes a rear wheel (WHr) of the vehicle to generate a rear wheel friction braking force (Fmr), and a controller (ECU) that controls the actuator (YU) and individually adjusts the front wheel torque (Tqf) and the rear wheel torque (Tqr).

In the braking control device for the vehicle according to the present invention, the controller (ECU) is configured to determine the front wheel torque (Tqf) and the rear wheel torque (Tqr) to zero when a regenerative braking force (Fg) generated by the regenerative generator (GN) has not reached a maximum regenerative force (Fx) which is a generatable maximum value, and increase the rear wheel torque (Tqr) from zero before increasing the front wheel torque (Tqf) from zero when the regenerative braking force (Fg) reaches the maximum regenerative force (Fx).

The present invention relates to a vehicle in which a regenerative generator (GN) is provided on a rear wheel (WHr). A braking control device for a vehicle according to the present invention includes an actuator (YU) that applies a front wheel torque (Tqf) that causes a front wheel (WHf) of the vehicle to generate a front wheel friction braking force (Fmf) and a rear wheel torque (Tqr) that causes the rear wheel (WHr) to generate a rear wheel friction braking force (Fmr), and a controller (ECU) that controls the actuator (YU) and individually adjusts the front wheel torque (Tqf) and the rear wheel torque (Tqr).

In the braking control device for the vehicle according to the present invention, the controller (ECU) is configured to determine the front wheel torque (Tqf) and the rear wheel torque (Tqr) to zero when a regenerative braking force (Fg) generated by the regenerative generator (GN) has not reached a maximum regenerative force (Fx) which is a generatable maximum value, and increase the front wheel torque (Tqf) from zero before increasing the rear wheel torque (Tqr) from zero when the regenerative braking force (Fg) reaches the maximum regenerative force (Fx).

DESCRIPTION OF EMBODIMENTS

<Symbols of Configuring Members, Etc., and Subscripts at the End of the Symbols>

In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders is described as a right front wheel cylinder CWi, a left front wheel cylinder CWj, a right rear wheel cylinder CWk, and a left rear wheel cylinder CWl. Furthermore, the subscripts "i" to "l" at the end of the symbols can be omitted. When the subscripts "i" to "l" are omitted, each symbol represents a generic name of each of the four wheels. For example, "WH" represents each wheel, and "CW" represents each wheel cylinder.

The suffixes "f" and "r" added to the end of various symbols are comprehensive symbols indicating which of the two braking systems, for the front and rear wheels, they are related to. Specifically, "f" indicates the front wheel system, and "r" indicates the rear wheel system. For example, in the wheel cylinder CW of each wheel, it is described as a front wheel cylinder CWf (=CWi, CWj) and a rear wheel cylinder CWr (=CWk, CWl). Furthermore, the subscripts "f" and "r" at the end of the symbols can be omitted. When the suffixes "f" and "r" are omitted, each symbol represents a generic name of each of the two braking systems. For example, "CW" represents a wheel cylinder in the front and rear braking systems.

<First Embodiment of Braking Control Device for Vehicle According to the Present Invention>

Figure 1:
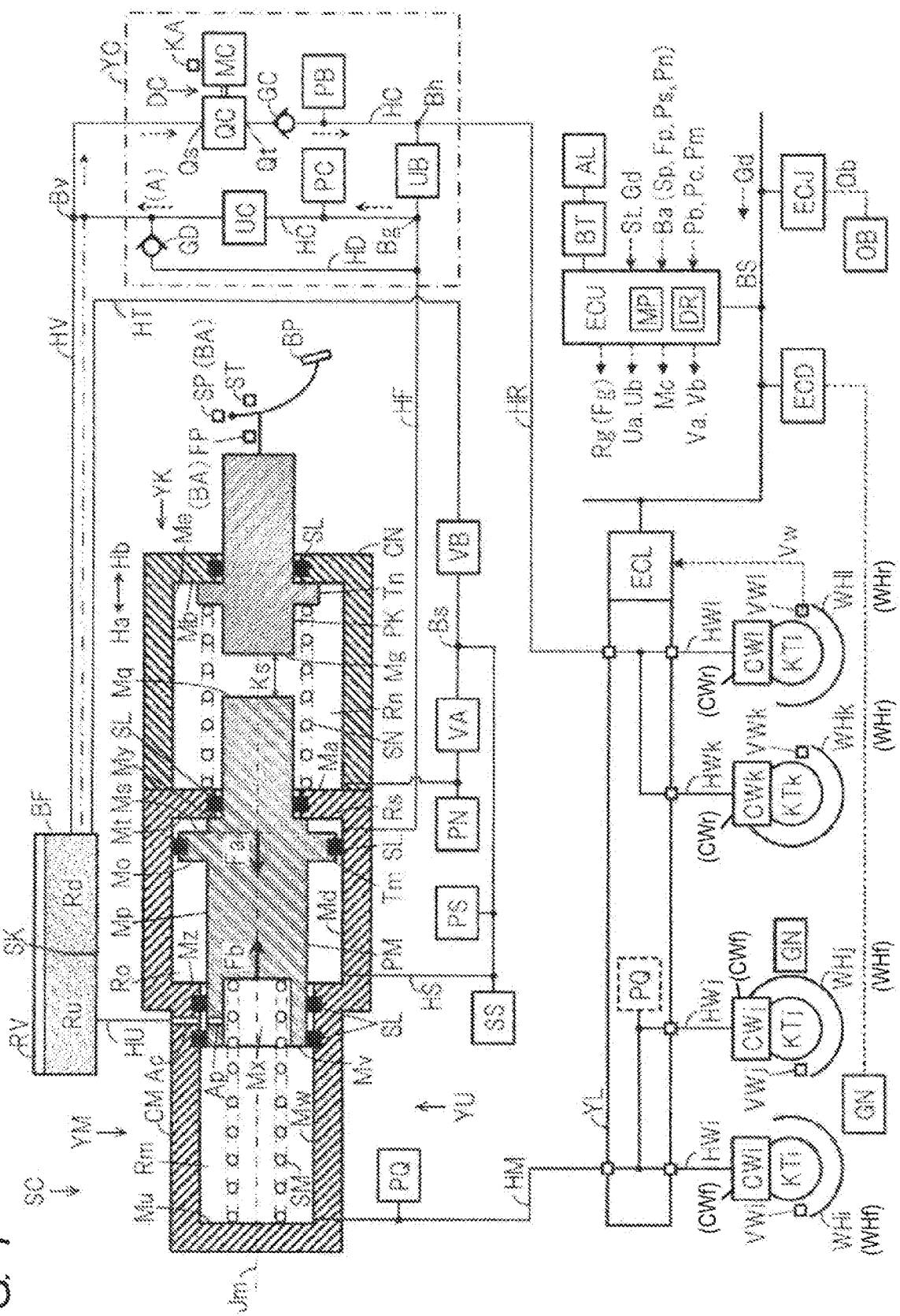
FIG. 1 is an overall configuration view for describing a first embodiment of a braking control device SC for a vehicle according to the present invention.

A first embodiment of a braking control device SC according to the present invention will be described with reference to an overall configuration view of FIG. 1. The vehicle employs two systems of fluid passages. The fluid passage is a passage for moving the brake fluid BF which is working liquid of the braking control device, and corresponds to a braking pipe, a fluid path of a fluid unit, a hose, and the like. The inside of the fluid passage is filled with the brake fluid BF. In the fluid passage, the side closer to the reservoir RV is called "upstream side" or "upper part", and the side closer to the wheel cylinder CW is called "downstream side" or "lower part".

That is, in the braking control device SC, a so-called front-rear type (also referred to as "H type") is adopted for the fluid passages of two systems. Specifically, the front wheel system connected to the front wheel cylinders CWi, CWj (also referred to as "front wheel cylinder CWf"), and the rear wheel system connected to the rear wheel cylinders CWk, CWl (also referred to as "rear wheel cylinder CWr") form a two-system fluid passage.

The vehicle is a hybrid vehicle or an electric vehicle, and is equipped with an electric motor GN for driving. The electric motor GN for driving also functions as a generator (power generator) for energy regeneration. For example, the generator GN is provided on the front wheel WHf. The vehicle is provided with a distance sensor OB (e.g., camera, radar etc.) so as to detect a distance (relative distance) Ob between an object existing in front of the own vehicle (another vehicle, fixed object, person, bicycle, etc.) and the own vehicle. The relative distance Ob is input to the driving assistance controller ECJ, and a required deceleration Gd is calculated based on the relative distance Ob. The required deceleration Gd is a target value of the vehicle deceleration for automatically braking on behalf of the driver without colliding with an object in front of the vehicle.

In the braking control device SC, a so-called regenerative coordination control (coordination between regenerative braking and friction braking) is executed. The regenerative coordination control is executed not only at the time of braking by the driver but also at the time of automatic braking by the driving assistance controller ECJ. The vehicle includes a braking operation member BP, a wheel cylinder CW, a reservoir RV, and a wheel speed sensor VW.

The braking operation member (e.g., brake pedal) BP is a member operated by the driver to decelerate the vehicle. The braking torque of the wheel WH is adjusted, and the braking force F (generic name of front wheel and rear wheel braking forces Ff, Fr) is generated at the wheel WH by operating the braking operation member BP. Specifically, a rotating member (e.g., a brake disc) KT is fixed to a wheel WH of the vehicle, and a brake caliper is arranged so as to sandwich the rotating member KT. The wheel cylinder CW is provided in the brake caliper, and as the pressure (braking liquid pressure) Pw of the brake fluid BF in the wheel cylinder CW is increased, the friction member (e.g., brake pad) is pressed against the rotating member KT. The frictional force generated at this time causes frictional braking torques (also simply referred to as "torque") Tqf, Tqr to be generated at the front and rear wheels WHf, WHr of the vehicle, and as a result, frictional braking forces Fmf, Fmr are generated. In other words, the front wheel and rear wheel friction braking forces Fmf and Fmr are generated by the front wheel and rear wheel torques Tqf and Tqr, which are adjusted according to the front wheel and rear wheel braking liquid pressures Pwf and Prw.

The reservoir (atmospheric pressure reservoir) RV is a tank for the working liquid, and the brake fluid BF is stored inside. Each wheel WH of the vehicle includes a wheel speed sensor VW to detect the wheel speed Vw. The signal of the wheel speed Vw is used for independent braking control of each wheel such as anti-skid control. The vehicle body speed Vx is calculated based on each wheel speed Vw detected by the wheel speed sensor VW.

<<Braking Control Device SC>>

The braking control device SC includes an upper fluid unit YU (corresponds to "actuator") and a lower fluid unit YL. The inside of each fluid unit YU, YL is made into a liquid tight state by the brake fluid BF. The upper fluid unit YU is controlled by an upper controller ECU, and the lower fluid unit YL is controlled by a lower controller ECL. The upper controller ECU and the lower controller ECL are connected through a communication bus BS so that respective signals (sensor detected value, calculated value, etc.) are shared.

The upper fluid unit YU of the braking control device SC is configured by an operation amount sensor BA, an operation switch ST, a simulator SS, a master unit YM, a pressure adjustment unit YC, and a regenerative coordination unit YK. The front wheel braking torque Tqf and the rear wheel braking torque Tqr are individually adjusted (controlled) by the upper fluid unit YU (actuator).

The operation amount sensor BA is provided so as to detect an operation amount Ba of the braking operation member (brake pedal) BP by the driver. An operation displacement sensor SP that detects an operation displacement Sp of the braking operation member BP is provided as the operation amount sensor BA. Furthermore, an operation force sensor FP is provided to detect an operation force Fp of the braking operation member BP. Moreover, a simulator liquid pressure sensor PS is provided as the operation amount sensor BA so as to detect a liquid pressure (simulator liquid pressure) Ps in a simulator SS. An input liquid pressure sensor PN is provided so as to detect the liquid pressure (input liquid pressure) Pn in the input chamber Rn of the regenerative coordination unit YK. The operation amount sensor BA is a generic term for the operation displacement sensor SP and the like, and as the braking operation amount Ba, at least one of the operation displacement Sp, the operation force Fp, the simulator liquid pressure Ps, and the input liquid pressure Pn is adopted. Furthermore, the braking operation member BP is provided with an operation switch ST so as to detect whether or not the driver operated the braking operation member BP. When the braking operation member BP is not operated (i.e., at the time of non-braking), an OFF signal is output as the operation signal St by the braking operation switch ST. On the other hand, when the braking operation member BP is being operated (i.e., at the time of braking), an ON signal is output as the operation signal St. The braking operation amount Ba and the operation signal St are input to the upper controller ECU.

The simulator SS is provided to cause the braking operation member BP to generate the operation force Fp. A piston and an elastic body are provided inside the simulator SS. When the brake fluid BF is moved into the simulator SS, the piston is pushed by the inflowing brake fluid BF. A force is applied to the piston in a direction of preventing the inflow of the brake fluid BF by the elastic body, so that the operation force Fp when the braking operation member BP is operated is formed.

[Master Unit YM]

The master unit YM adjusts the liquid pressure (front wheel braking liquid pressure) Pwf in the front wheel cylinder CWf through the master cylinder chamber Rm. The master unit YM is formed to include a master cylinder CM, a master piston PM, and a master elastic body SM.

The master cylinder CM is a cylinder member having a bottom portion. The master piston PM is a piston member inserted inside the master cylinder CM, and is movable in conjunction with the operation of the braking operation member BP. The inside of the master cylinder CM is partitioned into three liquid pressure chambers Rm, Rs, and Ro by the master piston PM.

A first inner peripheral portion Mw of the master cylinder CM and an outer peripheral portion (outer peripheral cylindrical surface) Mp of the master piston PM are sealed by the two seals SL. The master cylinder chamber (also simply referred to as the "master chamber") Rm is a liquid pressure chamber defined by the "first inner peripheral portion Mw and a first bottom portion (bottom surface) Mu of the master cylinder CM", and a first end My of the master piston PM. A master cylinder fluid passage HM is connected to the master chamber Rm.

The master piston PM is provided with a flange portion (flange) Tm. The inside of the master cylinder CM is partitioned by the flange portion Tm into a servo liquid pressure chamber (also simply referred to as "servo chamber") Rs and a rear liquid pressure chamber (also simply referred to as "rear chamber") Ro. A seal SL is provided on the outer peripheral portion of the flange portion Tm, so that the flange portion Tm and a second inner peripheral portion Md of the master cylinder CM are sealed. The servo chamber Rs is a liquid pressure chamber defined by "a second inner peripheral portion Md and a second bottom portion (bottom surface) Mt of the master cylinder CM" and a first surface Ms of the flange portion Tm of the master piston PM. The master chamber Rm and the servo chamber Rs are arranged to face each other with the master piston PM (particularly, flange portion Tm) interposed therebetween. The rear chamber Ro is a liquid pressure chamber defined by the second inner peripheral portion Md of the master cylinder CM, a stepped portion Mz, and a second surface Mo of the flange portion Tm of the master piston PM. The rear chamber Ro is located between the master chamber Rm and the servo chamber Rs in the direction of the center axis Jm. The pressure adjusting fluid passage HC is connected to the servo chamber Rs, and the simulator fluid passage HS is connected to the rear chamber Ro.

A master elastic body (e.g., compression spring) SM is provided between a depression Mx of the first end My of the master piston PM and the first bottom portion Mu of the master cylinder CM. The master elastic body SM presses the master piston PM against the second bottom portion Mt of the master cylinder CM in the direction of the center axis Jm of the master cylinder CM. At the time of non-braking, the stepped portion My of the master piston PM is in abutted against the second bottom portion Mt of the master cylinder CM. The position of the master piston PM in this state is referred to as "the initial position of the master unit YM". When the master piston PM is in the initial position, the master chamber Rm and the reservoir RV are connected.

When the master piston PM is moved along its center axis Jm, the connection between the master chamber Rm and the reservoir RV is shut off, and the pressure ("master cylinder liquid pressure", also referred to as "master liquid pressure") Pm is generated in the master chamber Rm. A biasing force Fb (referred to as a "reverse force") in the retreating direction Hb along the center axis Jm is applied to the master piston PM by the master liquid pressure Pm. The servo chamber Rs applies a biasing force Fa (referred to as a "forward force") opposing the reverse force Fb to the master piston PM by its internal pressure. That is, in the master piston PM, the forward force Fa by the liquid pressure Pv in the servo chamber Rs and the reverse force Fb by the liquid pressure Pm in the master chamber Rm oppose each other (face each other) in the direction of the center axis Jm, and are statically balanced. A master liquid pressure sensor PQ is provided so as to detect the master liquid pressure Pm. For example, the master liquid pressure sensor PQ may be included in the lower fluid unit YL.

[Pressure Adjustment Unit YC]

The liquid pressure Pwf of the front wheel cylinder CWf (as a result, front wheel torque Tqf) and the liquid pressure Pwr of the rear wheel cylinder CWr (rear wheel torque Tqr) are independently and individually adjusted by the pressure adjustment unit YC. Specifically, the braking liquid pressure Pwf of the front wheels WHf is individually adjusted at less than or equal to the braking liquid pressure Pwr of the rear wheels WHr. The pressure adjustment unit YC includes an electric pump DC, a check valve GC, first and second pressure adjusting valves UB, UC, and first and second adjusted liquid pressure sensors PB, PC.

In the electric pump DC, the electric motor MC and the fluid pump QC are fixed such that the electric motor MC and the fluid pump QC rotate integrally. The electric pump DC (particularly, the electric motor MC) is a power source for increasing the braking liquid pressure Pw at the time of control braking. The electric motor MC is controlled by the controller ECU. For example, a three-phase brushless motor is employed as the electric motor MC.

A suction port Qs of the fluid pump QC is connected to the reservoir RV through the first reservoir fluid passage HV. The pressure adjusting fluid passage HC is connected to a discharge port Qt of the fluid pump QC. By driving the electric pump DC (particularly, the fluid pump QC), the brake fluid BF is suctioned from the first reservoir fluid passage HV through the suction port Qs, and discharged from the discharge port Qt to the pressure adjusting fluid passage HC. For example, a gear pump is employed as the fluid pump QC.

The check valve GC (also referred to as a "check valve") is interposed in the pressure adjusting fluid passage HC. Two normally-open type pressure adjusting valves UB and UC are provided in series in the pressure adjusting fluid passage HC. Specifically, the first pressure adjusting valve UB is provided in the pressure adjusting fluid passage HC. Then, the second pressure adjusting valve UC is arranged between the first pressure adjusting valve UB and a portion By. The first and second pressure adjusting valves UB, UC are linear type solenoid valves (also referred to as "proportional valve" or "differential pressure valve") in which the valve opening amount (lift amount) is continuously controlled based on the energized state (e.g., supply current). The first and second pressure adjusting valves UB, UC are controlled by the controller ECU based on the drive signals Ub, Uc.

The brake fluid BF is pumped from the first reservoir fluid passage HV by the fluid pump QC, passed through the first pressure adjusting valve UB and the second pressure adjusting valve UC, and returned to the reservoir fluid passage HV. In other words, a reflux path (a fluid passage in which the flow of the brake fluid BF again returns to the original flow) is formed by the first reservoir fluid passage HV and the pressure adjusting fluid passage HC, and the first and second pressure adjusting valves UB, UC are interposed in series in the reflux path. When the electric pump DC is operated and the first and second pressure adjusting valves UB and UC are in the fully open state (since these are normally-open types, at a time of non-energization), the liquid pressure (adjusted liquid pressure) Pb, Pc in the pressure adjusting fluid passage HC are both substantially "0 (atmospheric pressure)". When the energization amount to the first pressure adjusting valve UB is increased and the reflux path is throttled by the pressure adjusting valve UB, the liquid pressure (first adjusted liquid pressure) Pb between the fluid pump QC and the first pressure adjusting valve UB in the pressure adjusting fluid passage HC is increased from "0". Furthermore, when the energization amount to the second pressure adjusting valve UC is increased and the reflux path is throttled by the pressure adjusting valve UC, the liquid pressure (second adjusted liquid pressure) Pc between the first pressure adjusting valve UB and the second pressure adjusting valve UC in the pressure adjusting fluid passage HC is increased from "0". Since the first and second pressure adjusting valves UB and UC are arranged in series in the pressure adjusting fluid passage HC, the second adjusted liquid pressure Pc adjusted by the second pressure adjusting valve UC is less than or equal to the first adjusted liquid pressure Pb. The first and second adjusted liquid pressure sensors PB and PC are provided in the pressure adjusting fluid passage HC so as to detect the first and second adjusted liquid pressures Pb and Pc.

The pressure adjusting fluid passage HC is branched to the rear wheel pressure adjusting fluid passage HR at a portion Bh between the fluid pump QC and the first pressure adjusting valve UB. The rear wheel pressure adjusting fluid passage HR is connected to the rear wheel cylinder CWr through the lower fluid unit YL. Therefore, the first adjusted liquid pressure Pb is directly introduced (supplied) to the rear wheel cylinder CWr. Furthermore, the pressure adjusting fluid passage HC is branched to the front wheel pressure adjusting fluid passage HF at a portion Bg between the first pressure adjusting valve UB and the second pressure adjusting valve UC. The front wheel pressure adjusting fluid passage HF is connected to the servo chamber Rs. Therefore, the second adjusted liquid pressure Pc is introduced (supplied) to the servo chamber Rs. Since the master cylinder CM is connected to the front wheel cylinder CWf through the lower fluid unit YL, the second adjusted liquid pressure Pc is indirectly introduced to the front wheel cylinder CWf through the master cylinder CM.

The pressure adjustment unit YC is provided with a bypass fluid passage HD that connects the reservoir RV and the servo chamber Rs in parallel with the pressure adjusting fluid passage HC. The check valve GD is interposed in the fluid passage HD. The check valve GD allows the flow of the brake fluid BF from the reservoir RV to the servo chamber Rs, but inhibits the flow from the servo chamber Rs to the reservoir RV When the braking operation member BP is suddenly operated, the master piston PM can also be moved in the advancing direction Ha by the operation force of the driver, and the volume of the servo chamber Rs can be increased. In this case, the liquid amount worth increase in volume of the servo chamber Rs caused by the driver's operation is supplied through the bypass fluid passage HD and the check valve GD. Since the amount of brake fluid BF supplied by the electric pump DC is efficiently used for increasing the braking liquid pressure Pw, the pressure-increase responsiveness at the time of sudden braking can be improved.

[Regenerative Coordination Unit YK]

The regenerative coordination unit YK achieves coordination control of friction braking and regenerative braking (referred to as "regenerative coordination control"). That is, a state can be formed in which the braking operation member BP is operated but the braking liquid pressure Pw is not generated by the regenerative coordination unit YK. The regenerative coordination unit YK includes an input cylinder CN, an input piston PK, an input elastic body SN, a first open/close valve VA, a second open/close valve VB, a simulator SS, a simulator liquid pressure sensor PS, and an input liquid pressure sensor PN.

The input cylinder CN is a cylinder member having a bottom portion fixed to the master cylinder CM. The input piston PK is a piston member inserted inside the input cylinder CN. The input piston PK is mechanically connected to the braking operation member BP. The input piston PK is provided with a flange portion (flange) Tn. The input elastic body SN is provided between the mounting surface Ma of the input cylinder CN to the master cylinder CM and the flange portion Tn of the input piston PK. The input elastic body SN presses the flange portion Tn of the input piston PK against the bottom portion Mb of the input cylinder CN in the direction of the center axis Jm.

At the time of non-braking, the stepped portion My of the master piston PM is abutted against the second bottom portion Mt of the master cylinder CM, and the flange portion Tn of the input piston PK is abutted against the bottom portion Mb of the input cylinder CN. At the time of non-braking, a gap Ks between the master piston PM (particularly, the end face Mq) and the input piston PK (particularly, the end face Mg) is set to a predetermined distance ks (referred to as an "initial gap") inside the input cylinder CN. That is, when the pistons PM and PK are at the positions in the most retreating direction Hb (referred to as "initial positions" of the respective pistons) (i.e., at the time of non-braking), the master piston PM and the input piston PK are separated by a predetermined distance ks. Here, the predetermined distance ks corresponds to the maximum value of a regeneration amount Rg. When the regenerative coordination control is executed, the gap (also referred to as "separation displacement") Ks is controlled (adjusted) by the second adjusted liquid pressure Pc.

The input cylinder CN is connected to the reservoir RV through the second reservoir fluid passage HT. A part of the second reservoir fluid passage HT can be shared with the first reservoir fluid passage HV. In the second reservoir fluid passage HT, two open/close valves VA and VB are provided in series. The first and second open/close valves VA and VB are two-position solenoid valves (also referred to as "on/off valves") having an open position (communicated state) and a closed position (shut-off state). The first and second open/close valves VA and VB are controlled by the upper controller ECU based on the drive signals Va, Vb. A normally-closed type solenoid valve is employed as the first open/close valve VA, and a normally-open type solenoid valve is employed as the second open/close valve VB.

The second reservoir fluid passage HT is connected to the simulator fluid passage HS at a connecting portion Bs between the first open/close valve VA and the second open/close valve VB. In other words, one end of the simulator fluid passage HS is connected to the rear chamber Ro, and the other end is connected to the portion Bs. The simulator SS is provided in the simulator fluid passage HS. When the regenerative coordination control is executed by the simulator SS, and the first open/close valve VA is at the open position and the second open/close valve VB is at the closed position, the operation force Fp of the braking operation member BP is generated.

A simulator liquid pressure sensor PS is provided so as to detect a liquid pressure (simulator liquid pressure) Ps in the simulator SS. In addition, the input liquid pressure sensor PN is provided so as to detect the liquid pressure (liquid pressure of the input chamber Rn, referred to as "input liquid pressure") Pn between the first open/close valve VA of the second reservoir fluid passage HT and the input chamber Rn. The simulator liquid pressure sensor PS and the input liquid pressure sensor PN are one of the braking operation amount sensors BA described above. The detected liquid pressures Ps, Pn are input to the upper controller ECU as the braking operation amount Ba.

[Upper Controller ECU]

The electric motor MC and the solenoid valves VA, VB, UB, UC are controlled by the upper controller ECU. Specifically, the upper controller ECU calculates drive signals Va, Vb, Ub, Uc for controlling the various solenoid valves VA, VB, UB, UC. Similarly, the drive signal Mc for controlling the electric motor MC is calculated. The solenoid valves VA, VB, UA, UC and the electric motor MC are driven based on these drive signals Va, Vb, Ua, Ub, Mc.

The upper controller (electronic control unit) ECU is network-connected to the lower controller ECL and the controller (ECD, ECJ, etc.) of another system through an in-vehicle communication bus BS. The regeneration amount (target value) Rg is transmitted from the upper controller ECU to the drive controller ECD through the communication bus BS so as to execute regenerative coordination control. Furthermore, the required deceleration (target value) Gd is transmitted from the driving assistance controller ECJ to the upper controller ECU through the communication bus BS.

[Lower Fluid Unit YL]

The lower fluid unit YL is a known fluid unit including a master liquid pressure sensor PQ, a plurality of solenoid valves, an electric pump, and a low pressure reservoir. The lower fluid unit YL is controlled by the lower controller ECL. The lower controller ECL calculates a vehicle body speed Vx based on the wheel speed Vw. Anti-skid control is executed based on the vehicle body speed Vx and the wheel speed Vw so as to suppress excessive deceleration slip of the wheel WH (e.g., wheel lock). The braking liquid pressure Pw of each wheel WH is individually controlled by the lower fluid unit YL. The calculated vehicle body speed Vx is input to the upper controller ECU through the communication bus BS.

[Operation of Braking Control Device SC]

At the time of non-braking (e.g., when the operation of the braking operation member BP is not performed), the solenoid valves VA, VB, UB, and UC are not energized. Therefore, the first open/close valve VA is at the closed position, and the second open/close valve VB is at the open position. At this time, the pistons PM and PN are pressed to their initial positions by the elastic bodies SM and SN, the master cylinder CM and the reservoir RV are in a communicated state, and the master liquid pressure Pm is "0 (atmospheric pressure)".

When the braking operation member BP is operated (i.e., at the time of braking), the input chamber Rn and the rear chamber Ro are connected and the simulator SS is connected to the input chamber Rn by the open position of the first open/close valve VA. Furthermore, the connection between the simulator SS and the reservoir RV is shut off by the closed position of the second open/close valve VB. The input piston PK is moved in the advancing direction Ha by the operation of the braking operation member BP, which movement causes the liquid amount flowing out from the input chamber Rn to flow into the simulator SS, thus forming the operation force Fp of the braking operation member BP.

When the vehicle deceleration is sufficient with the regenerative braking force Fg generated by the generator GN, the state of "Pb=Pc=0" is maintained. However, the input piston PK is moved in the advancing direction Ha from its initial position by the operation of the braking operation member BP. At this time, since the second adjusted liquid pressure Pc remains "0", the master piston PM is not moved. Therefore, the gap Ks (the distance between the end face Mg of the input piston PK and the end face Mq of the master piston PM) gradually decreases as the input piston PK advances.

When the vehicle deceleration is insufficient with the regenerative braking force Fg generated by the generator GN, the controller ECU controls the pressure adjustment unit YC, and the first and second adjusted liquid pressures Pb and Pc are adjusted. The first adjusted liquid pressure Pb is directly applied to the rear wheel cylinder CWr through the rear wheel pressure adjusting fluid passage HR and the lower fluid unit YL. The second adjusted liquid pressure Pc is applied to the servo chamber Rs through the front wheel pressure adjusting fluid passage HF. When the force (forward force) Fa in the advancing direction Ha generated by the liquid pressure (servo liquid pressure) Pv (=Pc) in the servo chamber Rs becomes larger than the set load of the master elastic body SM, the master piston PM is moved along the center axis Jm. This movement in the advancing direction Ha shuts off the master chamber Rm from the reservoir RV. Furthermore, when the second adjusted liquid pressure Pc is increased, the brake fluid BF is sent from the master cylinder CM toward the front wheel cylinder CWf at the master liquid pressure Pm. A force (reverse force) Fb in the retreating direction Hb acts on the master piston PM by the master liquid pressure Pm. The servo chamber Rs generates a force (forward force) Fa in the advancing direction Ha by the second adjusted liquid pressure Pc so as to oppose (oppose) the reverse force Fb. The master liquid pressure Pm is thus increased or decreased according to the increase or decrease of the adjusted liquid pressure Pc.

As the second adjusted liquid pressure Pc increases, the master piston PM moves from the initial position in the advancing direction Ha. At this time, the gap Ks can be adjusted independently of the braking operation amount Ba within the range of "0≤Ks≤ks" by the second adjusted liquid pressure Pc. That is, the gap Ks is adjusted by adjusting the second adjusted liquid pressure Pc, and regenerative coordination control is achieved.

When the braking operation member BP is returned, the second adjusted liquid pressure Pc is reduced by the pressure adjustment unit YC. Then, when the servo liquid pressure Pv (=Pc) becomes smaller than the master chamber liquid pressure Pm (=Pwf), the master piston PM is moved in the retreating direction Hb. When the braking operation member BP is in the non-operated state, the elastic force of the compression spring SM causes the master piston PM (particularly, the stepped portion My) to return to the position (initial position) where it comes into contact with the second bottom portion Mt of the master cylinder CM.

<First Processing Example of Pressure Adjusting Control>

Figure 2:
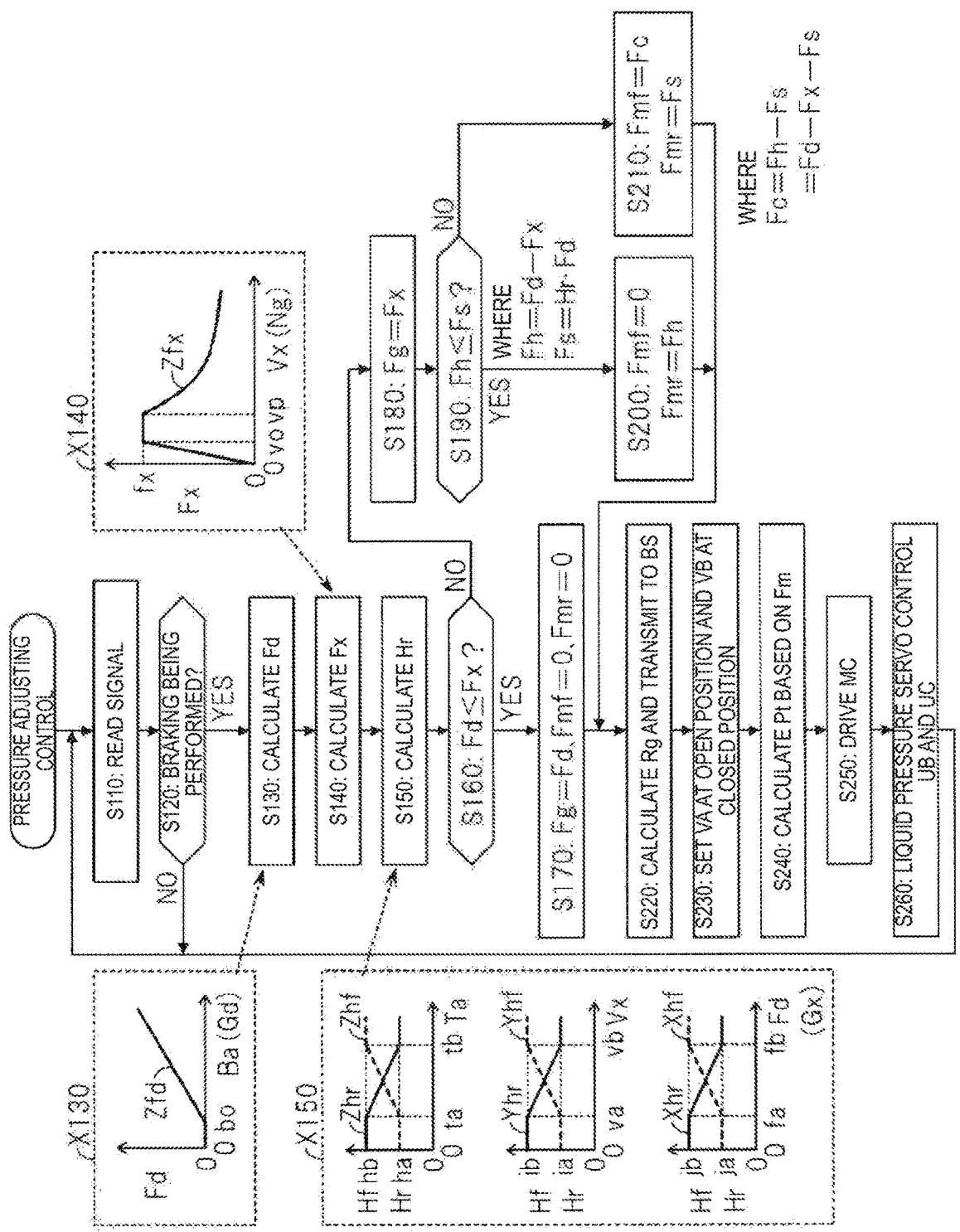
FIG. 2 is a control flowchart for describing a first processing example of a pressure adjusting control including regenerative coordination control.

With reference to the control flowchart of FIG. 2, a first processing example of the pressure adjusting control including the regenerative coordination control will be described. The "pressure adjusting control" is a drive control of the electric motor MC and the first and second pressure adjusting valves UB and UC for adjusting the first and second adjusted liquid pressures Pb and Pc. The control algorithm is programmed in the upper controller ECU.

In step S110, the braking operation amount Ba, the operation signal St, the first and second adjusted liquid pressures (detected values) Pb and Pc, the required deceleration Gd, and the vehicle body speed Vx are read. The operation amount Ba is detected by the operation amount sensor BA (e.g., operation displacement sensor SP, operation force sensor FP, input liquid pressure sensor PN, simulator liquid pressure sensor PS, etc.). The operation signal St is detected by the operation switch ST. The first and second adjusted liquid pressures Pb and Pc are detected by the first and second adjusted liquid pressure sensors PB and PC provided in the pressure adjusting fluid passage HC. The required deceleration Gd by automatic braking is acquired from the driving assistance controller ECJ through the communication bus BS. The vehicle body speed Vx is acquired from the lower controller ECL through the communication bus BS. The vehicle body speed Vx may be calculated by the upper controller ECU based on the wheel speed Vw when the wheel speed Vw is input to the upper controller ECU.

In step S120, "whether or not braking is being performed" is determined based on at least one of the braking operation amount Ba and the braking operation signal St. For example, when the operation amount Ba is greater than a predetermined value bo, positive determination is made in step S120 and the process proceeds to step S130. On the other hand, when the braking operation amount Ba is less than or equal to the predetermined value bo, negative determination is made in step S120 and the process returns to step S110. Here, the predetermined value bo is a constant set in advance that corresponds to the play of the braking operation member BP. When the operation signal St is on, the process proceeds to step S130, and when the operation signal St is off, the process returns to step S110.

At the time of automatic braking, in step S120, "whether or not braking is being performed" is determined based on the required deceleration Gd. For example, when the required deceleration Gd is greater than a predetermined value go, positive determination is made in step S120, and the process proceeds to step S130. On the other hand, when the required deceleration Gd is less than or equal to the predetermined value go, negative determination is made in step S120, and the process returns to step S110. The predetermined value go is a constant set in advance (e.g., "0").

In step S130, as shown in block X130, the required braking force Fd is calculated based on the operation amount Ba. The required braking force Fd is a target value of the total braking force F that acts on the vehicle, and is a braking force obtained by combining the "friction braking force Fm by the braking control device SC" and the "regenerative braking force Fg by the generator GN". According to the calculation map Zfd, the required braking force Fd is determined to be "0" when the operation amount Ba is in the range from "0" to the predetermined value bo, and is calculated to monotonically increase from "0" as the operation amount Ba increases when the operation amount Ba is greater than or equal to the predetermined value bo. Similarly, at the time of automatic braking, the required braking force Fd is calculated based on the required deceleration Gd. The required braking force Fd is determined to be "0" when the required deceleration Gd is greater than or equal to "0" and less than the predetermined value go, and is determined to monotonically increase from "0" as the required deceleration Gd increases when the required deceleration Gd is greater than or equal to the predetermined value bo.

In step S140, as shown in block X140, the maximum value of the regenerative braking force (referred to as "maximum regenerative force") Fx is calculated based on the vehicle body speed Vx and the calculation map Zfx. The regeneration amount of the generator GN is limited by the rating of the power transistor (IGBT etc.) of the drive controller ECD and the charge acceptability of the battery. For example, the regeneration amount of the generator GN is controlled to a predetermined electric power (electric energy per unit time). Since the electric power (power) is constant, the regenerative torque around the wheel shaft by the generator GN is inversely proportional to the rotation number of the wheel WH (i.e., the vehicle body speed Vx). Furthermore, when the rotation number Ng of the generator GN decreases, the regeneration amount decreases. In addition, an upper limit value is set for the regeneration amount. From the above, in the calculation map Zfx for the maximum regenerative force Fx, in the range where the vehicle body speed Vx is higher than or equal to "0" or lower than a first predetermined speed vo, the maximum regenerative force Fx is set to increase as the vehicle body speed Vx increases. Furthermore, in the range where the vehicle body speed Vx is higher than or equal to the first predetermined speed vo and lower than the second predetermined speed vp, the maximum regenerative force Fx is determined to be the upper limit value fx. Then, when the vehicle body speed Vx is higher than or equal to a second predetermined speed vp, the maximum regenerative force Fx is set to decrease as the vehicle body speed Vx increases. For example, in the decreasing characteristic of the maximum regenerative force Fx (characteristic of "Vx≥vp"), the relationship between the vehicle body speed Vx and the maximum regenerative force Fx is represented by a hyperbola (i.e., regenerative power is constant). Here, the respective predetermined values vo and vp are preset constants. In the calculation map Zfx, the rotation number Ng of the generator GN can be adopted instead of the vehicle body speed Vx.

In step S150, as shown in block X150, the rear wheel ratio Hr (corresponds to the "front-rear ratio") is calculated based on at least one of the turning state amount Ta, the vehicle body speed Vx, and the required braking force Fd. Alternatively, the rear wheel ratio Hr can be determined as a preset constant hr. The rear wheel ratio Hr is a value that represents the distribution ratio of the braking force between the front and rear wheels. The rear wheel ratio Hr is a distribution ratio (target value) of the rear wheel braking force Fr with respect to the braking force F of the entire vehicle. Assuming that the distribution ratio of the front wheel braking force Ff with respect to the braking force F that acts on the entire vehicle is the front wheel ratio Hf, a relationship of "Hf+Hr=1" is established. For example, the rear wheel ratio Hr is calculated based on the turning state amount Ta. The turning state amount Ta is a state amount that represents the degree of turning of the vehicle. At least one of the steering angle Sa, the yaw rate Yr, and the lateral acceleration Gy is adopted as the turning state amount Ta. The vehicle is provided with a steering angle sensor SA, a yaw rate sensor YR, and a lateral acceleration sensor GY, which are collectively called a "turning state sensor TA". The steering angle Sa is detected by the steering angle sensor SA, the yaw rate Yr is detected by the yaw rate sensor YR, and the lateral acceleration Gy is detected by the lateral acceleration sensor GY. The rear wheel ratio Hr is calculated according to the calculation map Zhr so as to decrease as the turning state amount Ta increases. Thus, as the turning state amount Ta becomes larger, the rear wheel braking force Fr becomes smaller and the lateral force of the rear wheels WHr is secured, so that the turning stability of the vehicle can be improved. The rear wheel ratio Hr has a lower limit value ha and an upper limit value hb.

The rear wheel ratio Hr (front-rear ratio) is calculated based on the vehicle body speed Vx. The rear wheel ratio Hr is calculated according to the calculation map Yhr so as to decrease as the vehicle body speed Vx increases. Thus, as the vehicle body speed Vx becomes higher, the rear wheel braking force Fr becomes smaller and the lateral force of the rear wheels WHr is secured, so that the directional stability (e.g., straightness) of the vehicle can be improved. The rear wheel ratio Hr has a lower limit value is and an upper limit value ib. The rear wheel ratio Hr is calculated based on the required braking force Fd. The rear wheel ratio Hr is calculated according to the calculation map Xhr so as to decrease as the required braking force Fd increases. Thus, as the required braking force Fd becomes larger, the rear wheel braking force Fr becomes smaller and the lateral force of the rear wheels WHr is secured, so that the directional stability of the vehicle can be improved, similar to the above. The rear wheel ratio Hr has a lower limit value ja and an upper limit value jb. Here, instead of the required braking force Fd, a longitudinal acceleration (deceleration) Gx detected by a longitudinal acceleration sensor GX provided in the vehicle may be adopted. That is, the rear wheel ratio Hr is calculated based on the degree of deceleration of the vehicle such that the rear wheel ratio Hr becomes smaller as such degree becomes larger.

In step S160, "whether or not the required braking force Fd is less than or equal to the maximum regenerative force Fx" is determined based on the required braking force Fd and the maximum regenerative force Fx. That is, whether or not the braking force Fd required by the driver can be achieved only by the regenerative braking force is determined. When "Fd Fx" and positive determination is made in step S160, the process proceeds to step S170. On the other hand, when "Fd>Fx" and negative determination is made in step S160, the process proceeds to step S180.

In step S170, the regenerative braking force (target value) Fg and the front wheel and rear wheel friction braking forces (target values) Fmf and Fmr are calculated based on the required braking force Fd. Specifically, the target regenerative braking force Fg is determined so as to match the required braking force Fd, and the target friction braking forces Fmf, Fmr of the front and rear wheels are calculated to be "0" (i.e., "Fg=Fd, Fmf=Fmr=0"). In other words, when the regenerative braking force Fg has not reached the maximum regenerative force Fx (when "Fg<Fx"), friction braking is not used for vehicle deceleration, and the required braking force Fd is achieved only by the regenerative braking.

In step S180, the regenerative braking force Fg is calculated based on the maximum regenerative force Fx. Specifically, the regenerative braking force Fg is calculated so as to match the maximum regenerative force Fx. That is, when the regenerative braking force Fg reaches the maximum regenerative force Fx (when "Fg≥Fx"), "Fg=Fx" is calculated and the regenerative energy is maximized.

In step S190, a rear wheel reference force Fs is calculated based on the required braking force Fd. The rear wheel reference force Fs is a value in which the front-rear ratio of the braking force (i.e., the rear wheel ratio Hr) is taken into consideration with respect to the required braking force Fd, and is used as a reference for achieving the rear wheel ratio Hr. Specifically, the required braking force Fd is multiplied by the rear wheel ratio Hr to calculate the rear wheel reference force Fs (i.e., "Fs=Hr×Fd"). Furthermore, a complementary braking force Fh is calculated based on the required braking force Fd and the maximum regenerative force Fx. The complementary braking force Fh is a braking force to be complemented by friction braking in order to achieve the required braking force Fd. Specifically, the maximum regenerative force Fx is subtracted from the required braking force Fd to calculate a complementary braking force Fh (i.e., "Fh=Fd−Fx"). Then, the complementary braking force Fh and the rear wheel reference force Fs are compared, and "whether or not the complementary braking force Fh is less than or equal to the rear wheel reference force Fs" is determined. When "Fh≤Fs", the process proceeds to step S200, and when "Fh>Fs", the process proceeds to step S210.

In step S200, the front wheel friction braking force Fmf is determined to be "0", and the rear wheel friction braking force Fmr is calculated so as to match the complementary braking force Fh (i.e., "Fmf=0, Fmr=Fh"). When the complementary braking force Fh is less than or equal to the rear wheel reference force Fs, the front wheel friction braking force Fmf is not generated on the front wheels WHf, and only the regenerative braking force Fg acts on the front wheels WHf. The friction braking force Fmr is generated on the rear wheels WHr so that the required braking force Fd is satisfied.

On the other hand, in step S210, the rear wheel friction braking force Fmr is calculated to match the rear wheel reference force Fs, and the front wheel friction braking force Fmf is calculated to be a value (referred to as "front wheel instruction force") Fc obtained by subtracting the rear wheel reference force Fs from the complementary braking force Fh (i.e., "Fmf=Fc=Fh−Fs, Fmr=Fs"). When the complementary braking force Fh is greater than the rear wheel reference force Fs, the rear wheel friction braking force Fmr is set to be the rear wheel reference force Fs that takes into consideration the rear wheel ratio Hr, and the amount (=Fc) insufficient with respect to the required braking force Fd is determined as the front wheel friction braking force Fmf.

In step S220, the regeneration amount Rg is calculated based on the regenerative braking force Fg. The regeneration amount Rg is a target value of the regeneration amount of the generator GN. The regeneration amount Rg is transmitted from the braking controller ECU to the drive controller ECD through the communication bus BS. In step S230, the first open/close valve VA is driven to the open position and the second open/close valve VB is driven to the closed position. In step S240, the target liquid pressure Pt (Ptf, Ptr) is calculated based on the target value Fm (Fmf, Fmr) of the friction braking force. That is, the friction braking force Fm is converted into a liquid pressure, and the target liquid pressure Pt is determined. The rear wheel target liquid pressure Ptr is a target value of the liquid pressure of the rear wheel cylinder CWr corresponding to the first adjusted liquid pressure Pb. The front wheel target liquid pressure Ptf is a target value of the liquid pressure of the front wheel cylinder CWf corresponding to the second adjusted liquid pressure Pc.

In step S250, the electric motor MC is driven and the reflux of the brake fluid BF including the fluid pump QC is formed. Note that the electric motor MC (electric pump DC) is driven (rotated) during braking even in the case of "Ptf=Ptr=0" in order to ensure pressure-increase responsiveness. Then, in step S260, the first pressure adjusting valve UB is servo-controlled so that the first adjusted liquid pressure Pb matches the rear wheel target liquid pressure Ptr based on the rear wheel target liquid pressure Ptr and the first adjusted liquid pressure Pb (detected value of the first adjusted liquid pressure sensor PB). Furthermore, the second pressure adjusting valve UC is servo-controlled so that the second adjusted liquid pressure Pc matches the front wheel target liquid pressure Ptf based on the front wheel target liquid pressure Ptf and the second adjusted liquid pressure Pc (detected value of the second adjusted liquid pressure sensor PC). In servo control, feedback control is performed so that the actual values Pb and Pc match the target value Pt.

The first and second pressure adjusting valves UB and UC are arranged in series in the pressure adjusting fluid passage HC. Therefore, in the liquid pressure feedback control of the first and second adjusted liquid pressures Pb and Pc, they may influence each other and so-called control interference may occur. In such a case, the control of the second adjusted liquid pressure Pc related to the front wheels WHf is prioritized over the control of the first adjusted liquid pressure Pb related to the rear wheels WHr. The front wheel braking force Ff is based on the fact that its contribution degree with respect to the total braking force F is higher than the rear wheel braking force Fr.

<Transition Example of Braking Force in the First Calculation Processing Example>

Figure 3:
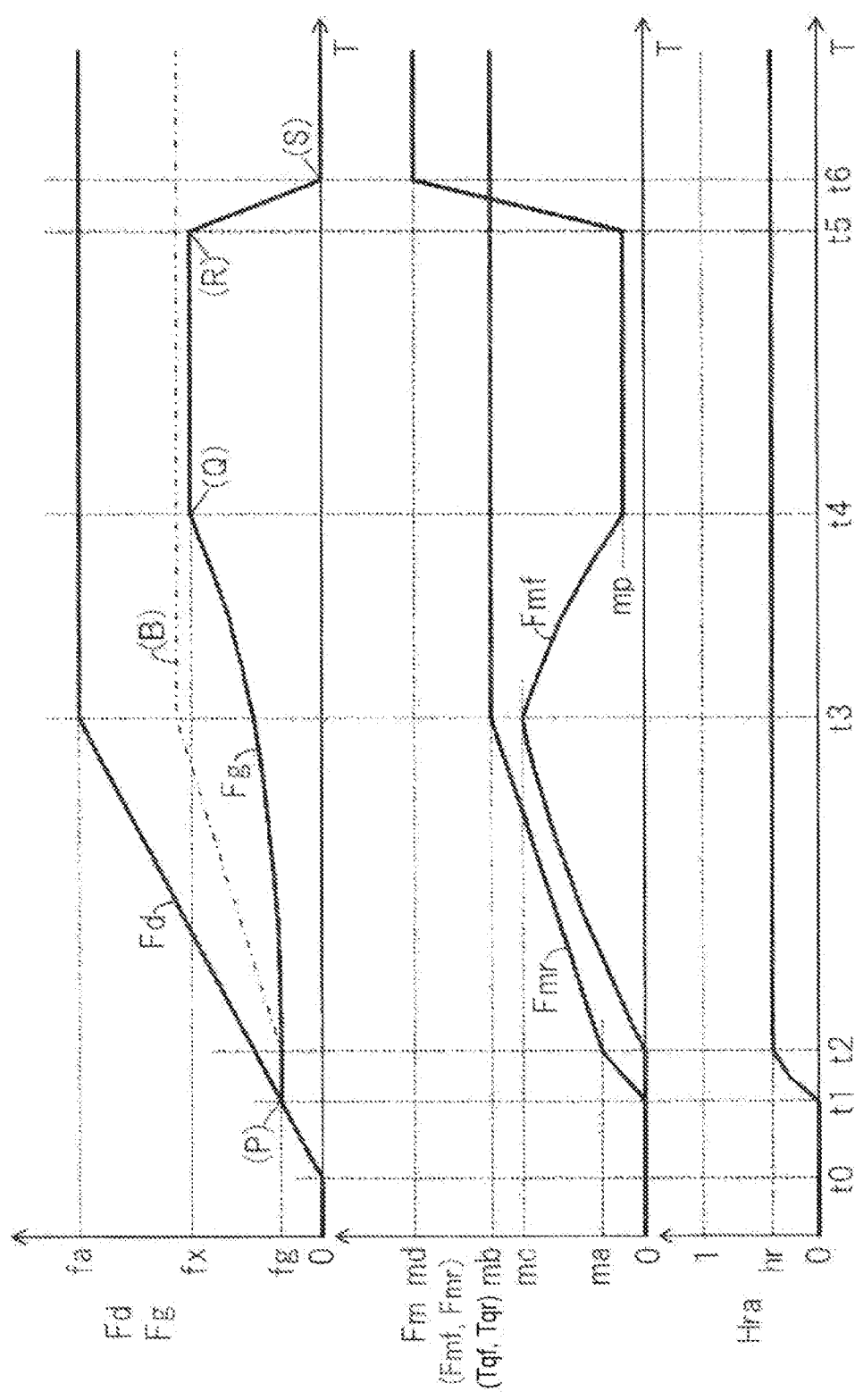
FIG. 3 is a time-series diagram describing a transition example of the braking force F corresponding to a first processing example.

A transition example of the braking force F corresponding to the first processing example will be described with reference to the time-series diagram of FIG. 3. Here, the regenerative generator GN is provided on the front wheel WHf, and the regenerative braking force Fg acts on the front wheel WHf in addition to the friction braking force Fmf. On the other hand, the generator GN is not provided on the rear wheel WHr. Therefore, the regenerative braking force does not act on the rear wheel WHr, and only the friction braking force Fmr acts. In the transition example, a case is assumed where the driver increases the operation amount of the braking operation member BP at a predetermined operation speed (constant value), then keeps the braking operation member BP constant, and stops the vehicle. The rear wheel ratio Hr is set to a preset constant value (constant) hr (i.e., "Hr=hr"). In the time-series diagram, in the required braking force Fd, the component by the regenerative braking force Fg corresponds to "a portion sandwiched by the X axis and the curve PQRS indicating the regenerative braking force Fg", the component by the front wheel friction braking force Fmf corresponds to "a portion sandwiched by the two-dot chain line (B) and the curve PQRS", and the component by the rear wheel friction braking force Fmr corresponds to "a portion sandwiched by the required braking force Fd and the two-dot chain line (B)".

At time t0, the operation of the braking operation member BP is started, and the braking operation amount Ba is increased from "0". At time t0, driving of the electric pump DC is started. The required braking force Fd is increased from "0" as the operation amount Ba increases. From time t0 to time t1, "Fd≤Fx", and thus "Fg=Fd, Fmf=Fmr=0 (process of S170)" is determined. Therefore, "Ptf=Ptr=0" is calculated, and the front wheel and rear wheel braking liquid pressures Pwf and Pwr (i.e., the front wheel and rear wheel torques Tqf and Tqr) are set to "0". That is, the friction braking force Fm is not generated, and the vehicle is decelerated only by the regenerative braking force Fg. That is, when the regenerative braking force Fg generated by the regenerative generator GN has not reached the maximum regenerative force Fx that can be generated (i.e., when "Fg<Fx"), the front wheel torque Tqf and the rear wheel torque Tqr are determined to be "0 (zero)". At this time, the actual rear wheel ratio Hra is "0".

At time t1, the required braking force Fd matches the maximum regenerative force Fx (the maximum value of the regenerative braking force that can be generated by the generator GN). From time t1, "Fd>Fx", and thus "Fg=Fx (process of S180)" is determined. Furthermore, since the complementary braking force Fh (=Fd−Fx) is smaller than the rear wheel reference force Fs (=Hr×Fd), "Fmf=0, Fmr=Fh (process of S200)" is calculated. Therefore, the rear wheel target liquid pressure Ptr is increased while the front wheel target liquid pressure Ptf remains at "0". As a result, the rear wheel braking liquid pressure Pwr is rapidly increased while the state of "Pwf=0" is maintained (i.e., the front wheel torque Tqf is "0" and the rear wheel torque Tqr is rapidly increased). That is, when the regenerative braking force Fg reaches the maximum regenerative force Fx, the rear wheel torque Tqr is increased from "0" before the front wheel torque Tqf is increased from "0" and the increase in the required braking force Fd is compensated only by the rear wheel torque Tqr. Therefore, the actual rear wheel ratio Hra is quickly changed from "0" toward the set value (constant) hr.

At time t2, the complementary braking force Fh matches the rear wheel reference force Fs (reference value according to the rear wheel distribution Hr). From time t2, "Fh>Fs", and thus "Fg=Fx, Fmf=Fc=Fh−Fs, Fmr=Fs (processes of S180, S210)" is calculated. Therefore, the target rear wheel liquid pressure Ptr is increased and the target front wheel liquid pressure Ptf is increased from "0", and as a result, both the front wheel and rear wheel braking liquid pressures Pwf and Pwr are increased. The increase of the front wheel torque Tqf is started, and the increasing gradient of the rear wheel torque Tqr (rear wheel friction braking force Fmr) is decreased from the state of "Fh≤Fs", and the increase is continued. When the vehicle body speed Vx (i.e., the rotation number Ng of the generator GN) is decreased, the maximum regenerative force Fx is increased, and accordingly, the regenerative braking force Fg is increased (see the characteristic Zfx of block X140). The front wheel braking liquid pressure Pwf (i.e., the front wheel torque Tqf) is determined based on the front wheel instruction force Fc, and the rear wheel braking liquid pressure Pwr (i.e., the rear wheel torque Tqr) is determined based on the rear wheel reference force Fs. Thus, the rear wheel ratio Hra (including the regenerative braking force Fg) can be suitably maintained at the target set value hr.

At time t3, the braking operation amount Ba is held, and the required braking force Fd becomes constant at the value fa. Even if the required braking force Fd is constant, the maximum regenerative force Fx is increased and the regenerative braking force Fg is increased according to the vehicle deceleration. From time t3, the change in the regenerative braking force Fg is compensated, and the front wheel friction braking force Fmf (i.e., the front wheel torque Tqf) is decreased so that the rear wheel ratio Hra is maintained at the target value hr. At this time, the rear wheel friction braking force Fmr is maintained at the value mb (=Fs). At time t4, the vehicle body speed Vx becomes the predetermined speed vp, and the regenerative braking force Fg (=Fx) reaches the upper limit value fx. From time t4, the required braking force Fd and the regenerative braking force Fg are constant, and thus the front wheel friction braking force Fmf is maintained at the value mp while the rear wheel friction braking force Fmr is maintained at the value mb.

At time t5, the vehicle body speed Vx reaches the predetermined speed vo, and the maximum regenerative force Fx decreases. That is, at time t5, the switching operation between regenerative braking and friction braking is started. At this time, the rear wheel friction braking force Fmr is made constant, and the decrease in the regenerative braking force Fg is compensated by the front wheel friction braking force Fmf. After the rear wheel friction braking force Fmr reaches the rear wheel reference force Fs (=mb), the rear wheel friction braking force Fmr is held constant, and the fluctuation of the regenerative braking force Fg is adjusted by the front wheel friction braking force Fmf, and thus the rear wheel ratio (actual value) Hra including the regenerative braking force Fg can be maintained at the target value hr.

When the required braking force Fd can be achieved only by the regenerative braking force Fg, the front wheel and rear wheel torques Tqf and Tqr are set to "0", and the friction braking force is not generated, and thus the energy regeneration by the generator GN can be maximized. When the required braking force Fd cannot be achieved only by the regenerative braking force Fg, the rear wheel torque Tqr is increased to a value corresponding to the rear wheel reference force Fs that takes into consideration the front-rear distribution ratio of the braking force while the front wheel torque Tqf is maintained at "0". Therefore, the desired distribution ratio hr can be quickly achieved. After the target distribution ratio hr is achieved, the front wheel torque Tqf is increased, the increasing gradient of the rear wheel torque Tqr is decreased, and the rear wheel torque Tqr is increased. Therefore, the target ratio hr can be suitably maintained.

<Another Transition Example of Braking Force in the First Calculation Processing Example>

Figure 4:
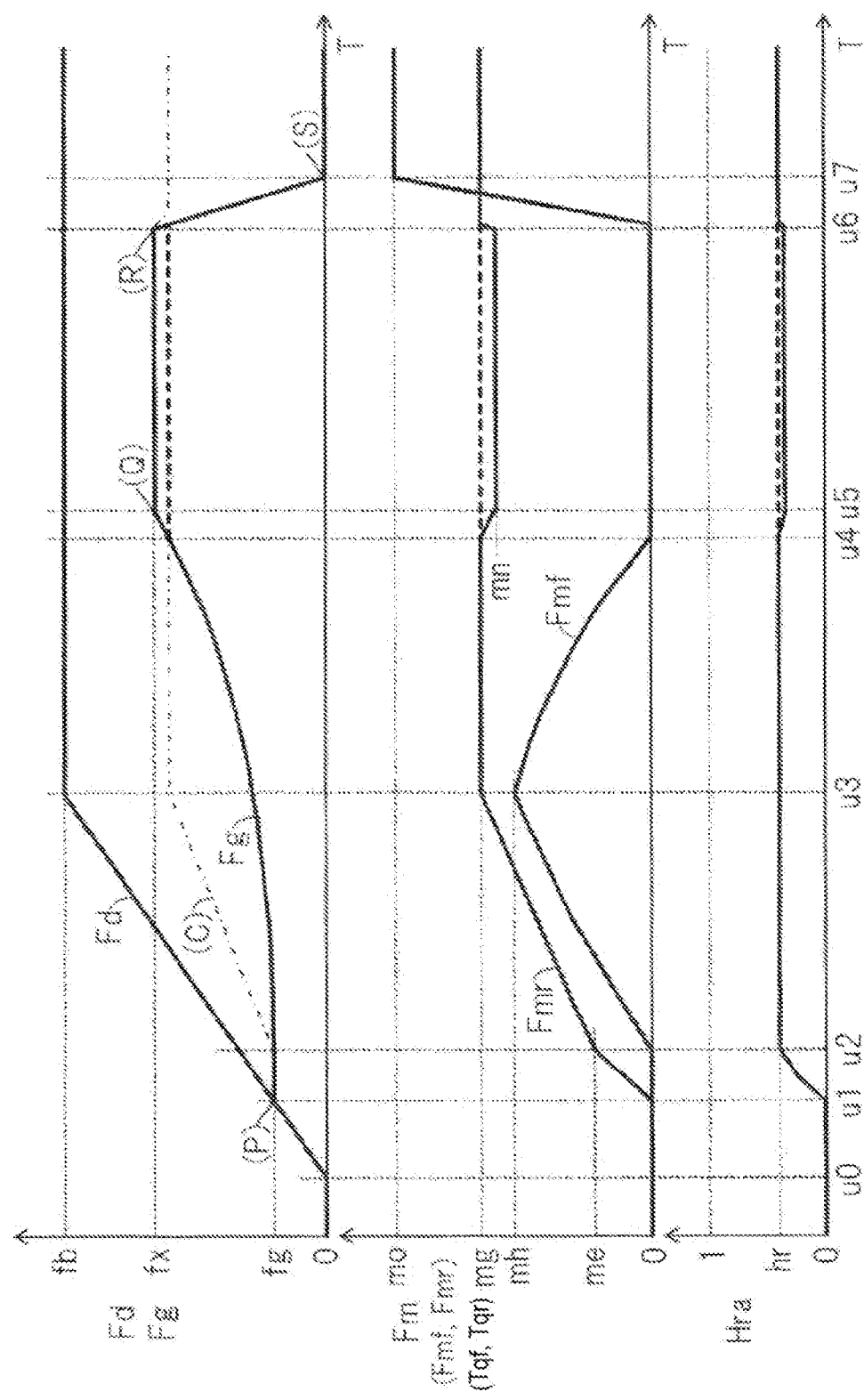
FIG. 4 is a time-series diagram describing another transition example of the braking force F corresponding to the first processing example.

Another transition example of the braking force F corresponding to the first processing example will be described with reference to the time-series diagram of FIG. 4. In the transition example with reference to FIG. 3, the front wheel friction braking force Fmf is generated even in a state where the maintenance value fa of the required braking force Fd is relatively large and the vehicle body speed Vx is low (between times t4 and t5). In another transition example, a case where the maintenance value fb of the required braking force Fd is relatively small will be described. In another transition example, a case where "Fh<Fs" is set in a state where the vehicle body speed Vx is low (between times u4 and u6) is assumed.

Since the times u1 to u3 are the same, description will be made briefly. At time u0, the operation of the braking operation member BP is started, and the required braking force Fd is increased. Until time u1, "Fd≤Fx", "Fg=Fd, and thus Fmf=Fmr=0 (process of S170)" is determined, and the front wheel and rear wheel torques Tqf, Tqr remain "0". After time u1, "Fd>Fx", and thus "Fg=Fx, Fmf=0, Fmr=Fh (processes of S180, S200)" is determined. The front wheel torque Tqf is set to "0" and the rear wheel torque Tqr is quickly increased so that the rear wheel ratio Hra quickly approaches the set value hr. After time u2, "Fh>Fs", and thus "Fg=Fx, Fmf=Fc, Fmr=Fs (processes of S180, S210)" is calculated. Compared to a case where "Fh≤Fs", the increasing gradient of the rear wheel torque Tqr is decreased and the front wheel torque Tqf is increased so that the rear wheel ratio Hra is maintained at the set value hr.

At time u3, the operation amount Ba is made constant. From time u3, the front wheel friction braking force Fmf is maintained at a constant value mg, but the front wheel friction braking force Fmf is decreased to compensate for the increase in the regenerative braking force Fg. At time u4, "Fh=Fs" is established, and thereafter, the state of "Fh<Fs" is continued, and the complementary braking force Fh cannot be adjusted only by the front wheel friction braking force Fmf. Therefore, "Fg=Fx, Fmf=0, Fmr=Fh" is calculated, and the rear wheel friction braking force Fmr is decreased from the value mg while the front wheel friction braking force Fmf remains at "0". As a result, the rear wheel braking liquid pressure Pwr (rear wheel torque Tqr) is decreased so that the required braking force Fd is satisfied while the state of "Pwf (Tqf)=0" is maintained. At this time, the rear wheel ratio Hra is slightly decreased from the set value hr.

At time u6, the vehicle body speed Vx reaches the predetermined speed vo, the maximum regenerative force Fx starts to decrease, and the switching operation between regenerative braking and friction braking is started. In this operation, first, the rear wheel friction braking force Fmr is increased and returned to the value mg. Thereafter, the rear wheel friction braking force Fmr is made constant and the front wheel friction braking force Fmf is increased. The decrease in the regenerative braking force Fg is compensated.

In other transition examples as well, similar effects as described above (maximization of energy regeneration, rapid achievement and reliable continuation of the desired ratio) are achieved. In addition, when the regenerative braking force Fg is increased due to vehicle deceleration, the front wheel torque Tqf is set to "0" and the rear wheel torque Tqr is decreased from the value corresponding to the rear wheel reference force Fs. Therefore, the required braking force Fd (i.e., the vehicle deceleration required by the driver) according to the braking operation amount Ba can be achieved while maximizing the energy regeneration. The rear wheel ratio Hra is decreased from the desired ratio hr, but the vehicle body speed Vx is low, so that the influence on the vehicle stability is slight. Furthermore, in the switching operation accompanying the decrease in the regenerative braking force Fg, the front wheel friction braking force Fmf is increased after the rear wheel torque Tqr is increased. Therefore, the rear wheel ratio Hra can be maintained at the desired ratio hr. Here, when the decrease amount of the rear wheel torque Tqr is slight, the front wheel and rear wheel torques Tqf and Tqr can be simultaneously increased by the switching operation. Alternatively, only the front wheel torque Tqf may be increased while the rear wheel torque Tqr remains in the decreased state.

In the above transition examples, the rear wheel friction braking force Fmr (rear wheel torque Tqr) is adjusted to decrease so as to satisfy the required braking force Fd between the times u4 and u6. Instead, the regenerative braking force Fg may be adjusted. In this case, as indicated by a broken line, while the rear wheel friction braking force Fmr is maintained at the value mg, the regenerative braking force Fg is decreased from the maximum regenerative force Fx (i.e., the upper limit value fx). The rear wheel ratio Hra can always be maintained at the desired distribution ratio hr.

<Second Embodiment of Braking Control Device for Vehicle According to the Present Invention>

Figure 5:
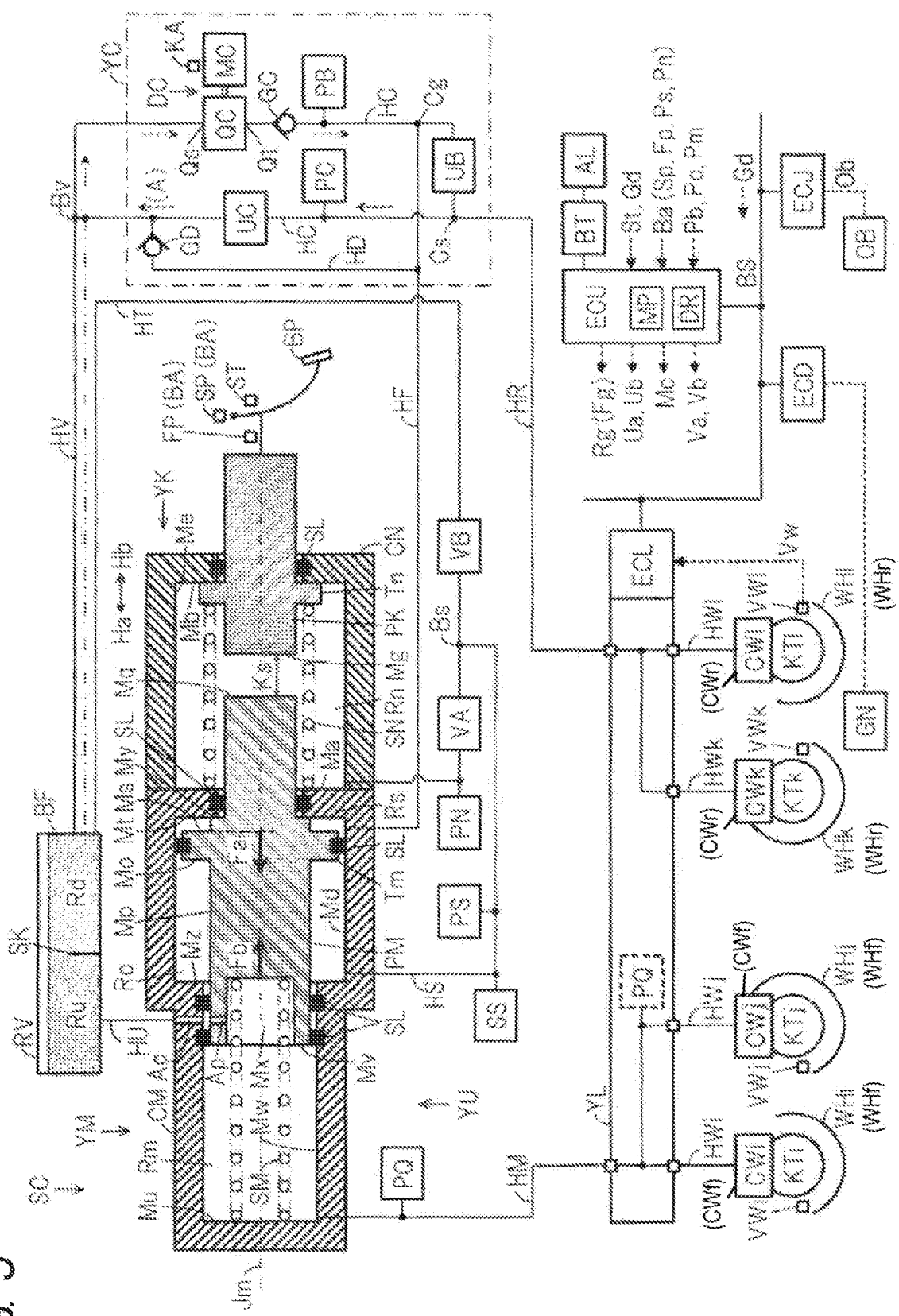
FIG. 5 is an overall configuration view for describing a second embodiment of a braking control device SC for a vehicle according to the present invention.

A second embodiment of a braking control device SC according to the present invention will be described with reference to an overall configuration view of FIG. 5. In the first embodiment described with reference to FIG. 1, the generator GN is provided on the front wheels WHf (WHi, WHj). In the second embodiment, the generator GN is provided on the rear wheels WHr (WHk, WHl).

Similar to the first embodiment, in the second embodiment as well, configuring members, calculation processes, signals, characteristics, and values having the same symbol have the same functions. The suffixes "i" to "l" at the end of the symbols are comprehensive symbols indicating which wheel is related, where "i" is the right front wheel, "j" is the left front wheel, "k" is the right rear wheel, and "l" is the left rear wheel. When the subscripts "i" to "l" are omitted, each symbol represents a generic name of each of the four wheels. The suffixes "f" and "r" at the end of the symbols are comprehensive symbols indicating which system of the front and rear wheels is related to in the fluid passages of two systems (the movement path of the brake fluid BF), where "f" Indicates a front wheel system, and "r" indicates a rear wheel system. If the suffixes "f" and "r" are omitted, they represent the generic name of the two systems. In each fluid passage, "upstream side or upper part" is a side closer to the reservoir RV, and "downstream side or lower part" is a side closer to the wheel cylinder CW. The differences will be described below.

Similar to the first embodiment, in the second embodiment as well, in the pressure adjustment unit YC, two pressure adjusting valves UB and UC are provided in series in the pressure adjusting fluid passage HC. Specifically, the first pressure adjusting valve UB and the second pressure adjusting valve UC are arranged in this order along the circulation flow (A) of the brake fluid BF. Then, the second pressure adjusting valve UC adjusts the second adjusted liquid pressure Pc to increase from "0 (atmospheric pressure)", and the first pressure adjusting valve UB adjusts the first adjusted liquid pressure Pb to increase from the second adjusted liquid pressure Pc. Conversely, the first pressure adjusting valve UB adjusts the first adjusted liquid pressure Pb, and the second pressure adjusting valve UC adjusts the second adjusted liquid pressure Pc to decrease from the first adjusted liquid pressure Pb. That is, the first adjusted liquid pressure Pb and the second adjusted liquid pressure Pc are in a relationship of "Pb≥Pc".

In the second embodiment, the liquid pressure Pwf of the front wheel cylinder CWf and the liquid pressure Pwr of the rear wheel cylinder CWr can be adjusted independently. Then, the liquid pressure Pwr of the rear wheel WHr provided with the generator GN is adjusted to be less than or equal to the braking liquid pressure Pwf of the front wheel WHf not provided with the generator GN. Specifically, the pressure adjusting fluid passage HC is branched to the front wheel pressure adjusting fluid passage HF at a portion Cg between the fluid pump QC and the first pressure adjusting valve UB. The front wheel pressure adjusting fluid passage HF is connected to the servo chamber Rs, and the first adjusted liquid pressure Pb is introduced (supplied) to the servo chamber Rs. Therefore, the first adjusted liquid pressure Pb is indirectly introduced into the front wheel cylinder CWf through the master cylinder CM. That is, the first adjusted liquid pressure Pb is supplied to the front wheel cylinder CWf in the order of "Rs→Rm→CWf". Furthermore, the pressure adjusting fluid passage HC is branched to the rear wheel pressure adjusting fluid passage HR at a portion Cs between the first pressure adjusting valve UB and the second pressure adjusting valve UC. The rear wheel pressure adjusting fluid passage HR is connected to the rear wheel cylinder CWr through the lower fluid unit YL. Therefore, the second adjusted liquid pressure Pc is directly introduced (supplied) to the rear wheel cylinder CWr and adjusted within the range of "0≤Pc≤Pb". The pressure adjustment unit YC is configured to include first and second solenoid valves UB and UC, where the first pressure adjusting valve UB adjusts the brake fluid BF discharged by the electric pump DC to the first adjusted liquid pressure Pb, which first adjusted liquid pressure Pb is introduced into the servo chamber Rs. Then, the second pressure adjusting valve UC adjusts the first adjusted liquid pressure Pb to decrease to the second adjusted liquid pressure Pc, which second adjusted liquid pressure Pc is introduced into the rear wheel cylinder CWr.

In the second embodiment, the gap (separation displacement) Ks is adjusted by adjusting the first adjusted liquid pressure Pb, and regenerative coordination control is achieved. When the braking operation member BP is in a state of "Ba=0", "Ks=ks", but the first adjusted liquid pressure Pb is controlled independently of the braking operation amount Ba, and thus the gap Ks is adjusted in a range of greater than or equal to "0" and less than or equal to an initial gap ks. Therefore, the master liquid pressure Pm (=Pwf) can be adjusted independently of the braking operation amount Ba.

<Second Processing Example of Pressure Adjusting Control>

Figure 6:
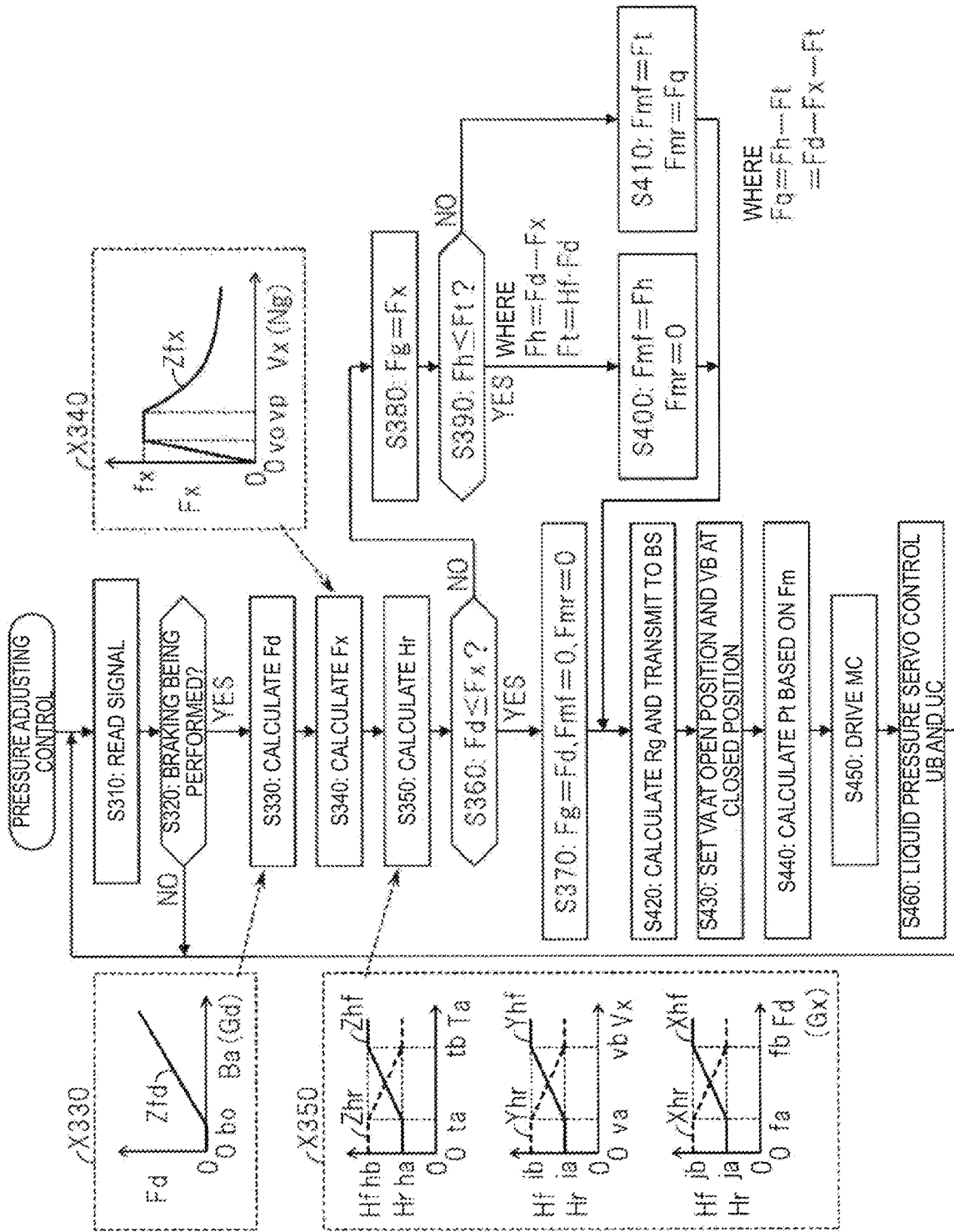
FIG. 6 is a control flowchart describing a second processing example of a pressure adjusting control including regenerative coordination control.

A second processing example of the pressure adjusting control corresponding to the second embodiment will be described with reference to the control flow chart of FIG. 6. In the first processing example, the process is performed based on the rear wheel reference force Fs, whereas in the second processing example, the process is performed based on the front wheel reference force Ft.

Steps S310 to S340 are the same as the processes of steps S110 to S140.

In step S310, various signals (Ba, St, Pb, Pc, Gd, Vx, etc.) are read. In step S320, "whether or not braking is being performed" is determined based on at least one of the braking operation amount Ba, the braking operation signal St, and the required deceleration Gd. The process proceeds to step S330 at the time of braking, but returns to step S310 at the time of non-braking. In step S330, the required braking force Fd is calculated based on the calculation map Zfd shown in block X330 (same as block X130). The required braking force Fd is a target value of the total braking force F to be acted on the vehicle according to the operation of the braking operation member BP or automatic braking. In step S340, the maximum regenerative force Fx is calculated based on the calculation map Zfx shown in block X340 (same as block X140). The maximum regenerative force Fx is the maximum value of the regenerative braking force Fg that can be generated by the generator GN.

In step S350, as shown in block X350 (same as block X150), the front wheel ratio Hf (corresponds to the "front-rear ratio") is calculated based on at least the turning state amount Ta, the vehicle body speed Vx, and the required braking force Fd. Alternatively, the front wheel ratio Hf is determined as a preset constant hf. The front wheel ratio Hf is a value (target value) that represents the distribution ratio of the braking force between the front and rear wheels. The relationship between the front wheel and rear wheel distribution ratios Hf and Hr is "Hf+Hr=1". For example, the front wheel ratio Hf is calculated based on the turning state amount Ta (at least one of the steering angle Sa, the yaw rate Yr, and the lateral acceleration Gy). The front wheel ratio Hf is calculated according to the calculation map Zhf so as to increase as the turning state amount Ta increases. As the turning state amount Ta becomes larger, the lateral force of the rear wheels WHr is secured, and thus the turning stability of the vehicle can be improved. The front wheel ratio Hf has a lower limit value ha and an upper limit value hb.

The front wheel ratio (front-rear ratio) Hf is calculated based on the vehicle body speed Vx. The front wheel ratio Hf is calculated according to the calculation map Yhf so as to increase as the vehicle body speed Vx increases. As the vehicle body speed Vx becomes higher, the lateral force of the rear wheels WHr is secured, so that the directional stability (e.g., straightness) of the vehicle can be improved. The front wheel ratio Hf has a lower limit value is and an upper limit value ib. Furthermore, the front wheel ratio Hf is calculated based on the required braking force Fd. The front wheel ratio Hf is calculated according to the calculation map Xhf so as to increase as the required braking force Fd increases. As the required braking force Fd becomes larger, the lateral force of the rear wheels WHr is secured, and thus the directional stability of the vehicle can be improved. The front wheel ratio Hf has a lower limit value j a and an upper limit value jb. The longitudinal acceleration (deceleration) Gx may be adopted instead of the required braking force Fd. That is, the front wheel ratio Hf is calculated based on the degree of deceleration of the vehicle such that the front wheel ratio Hf becomes larger as such degree becomes larger.

Steps S360 to S380 are the same as the processes of steps S160 to S180.

In step S360, "whether or not the required braking force Fd is less than or equal to the maximum regenerative force Fx" is determined based on the required braking force Fd and the maximum regenerative force Fx. When "Fd≤Fx", the process proceeds to step S370. On the other hand, when "Fd>Fx", the process proceeds to step S380. In step S370, the regenerative braking force (target value) Fg and the front wheel and rear wheel friction braking forces (target values) Fmf and Fmr are calculated based on the required braking force Fd. Specifically, it is calculated as "Fg=Fd, Fmf=Fmr=0". In other words, when the regenerative braking force Fg has not reached the maximum regenerative force Fx (when "Fg<Fx"), friction braking is not used for vehicle deceleration, and the required braking force Fd is achieved only by the regenerative braking. In step S380, the regenerative braking force Fg is calculated based on the maximum regenerative force Fx. Specifically, "Fg=Fx" is calculated. That is, when the regenerative braking force Fg reaches the maximum regenerative force Fx, the maximum possible energy is regenerated.

In step S390, the front wheel reference force Ft is calculated based on the required braking force Fd. The front wheel reference force Ft is a value in which the front-rear ratio of the braking force (i.e., the front wheel ratio Hf) is taken into consideration with respect to the required braking force Fd, and is used as a reference for achieving the front wheel ratio Hf. For example, the required braking force Fd is multiplied by the front wheel ratio Hf to calculate the front wheel reference force Ft (i.e., "Ft=Hf×Fd"). Furthermore, a complementary braking force Fh is calculated based on the required braking force Fd and the maximum regenerative force Fx. The complementary braking force Fh is a braking force to be complemented by friction braking in order to achieve the required braking force Fd. Specifically, the maximum regenerative force Fx is subtracted from the required braking force Fd to calculate a complementary braking force Fh (i.e., "Fh=Fd−Fx"). Then, the complementary braking force Fh and the front wheel reference force Ft are compared, and "whether or not the complementary braking force Fh is less than or equal to the front wheel reference force Ft" is determined. When "Fh≤Ft", the process proceeds to step S400, and when "Fh>Ft", the process proceeds to step S410.

In step S400, the rear wheel friction braking force Fmr is determined to be "0", and the front wheel friction braking force Fmf is calculated so as to match the complementary braking force Fh (i.e., "Fmf=Fh, Fmr=0"). When the complementary braking force Fh is less than or equal to the front wheel reference force Ft, the rear wheel friction braking force Fmr is not generated on the rear wheels WHr, and only the regenerative braking force Fg acts on the rear wheels WHr. On the other hand, in step S410, the front wheel friction braking force Fmf is calculated to match the front wheel reference force Ft, and the rear wheel friction braking force Fmr is calculated to be a value (referred to as "rear wheel instruction force") Fq obtained by subtracting the front wheel reference force Ft from the complementary braking force Fh (i.e., "Fmf=F, Fmr=Fq=Fh−Ft"). When the complementary braking force Fh is greater than the front wheel reference force Ft, the front wheel friction braking force Fmf is set to be the front wheel reference force Ft that takes into consideration the front wheel ratio Hf, and the amount (=Fq) insufficient with respect to the required braking force Fd is determined as the rear wheel friction braking force Fmr.

In step S420, the regeneration amount Rg (target value) is calculated based on the regenerative braking force Fg, and is transmitted to the drive controller ECD through the communication bus BS. In step S430, the first open/close valve VA is driven to the open position and the second open/close valve VB is driven to the closed position. In step S440, the target liquid pressures Ptf, Ptr are calculated based on the target values Fmf, Fmr of the friction braking force. The front wheel target liquid pressure Ptf is a target value of the liquid pressure of the front wheel cylinder CWf corresponding to the first adjusted liquid pressure Pb. The rear wheel target liquid pressure Ptr is a target value of the liquid pressure of the rear wheel cylinder CWr corresponding to the second adjusted liquid pressure Pc.

In step S450, the electric motor MC is driven and the reflux of the brake fluid BF including the fluid pump QC is formed. The electric motor MC is driven at the time of braking even if "Ptf=Ptr=0" due to the pressure-increase responsiveness. In step S460, the first pressure adjusting valve UB is servo-controlled so that the first adjusted liquid pressure Pb matches the front wheel target liquid pressure Ptf based on the front wheel target liquid pressure Ptf and the first adjusted liquid pressure Pb (detected value), Furthermore, the second pressure adjusting valve UC is servo-controlled so that the second adjusted liquid pressure Pc matches the rear wheel target liquid pressure Ptr based on the rear wheel target liquid pressure Ptr and the second adjusted liquid pressure Pc. That is, feedback control is performed so that the first and second adjusted liquid pressures (actual values) Pb and Pc match the target values Ptf and Ptr.

Similarly, since the first and second pressure adjusting valves UB and UC are arranged in series in the pressure adjusting fluid passage HC, mutual interference may occur in the liquid pressure feedback control of the first and second adjusted liquid pressures Pb and Pc. Since the front wheel braking force Ff has a higher degree of contribution with respect to the total braking force F than the rear wheel braking force Fr, the control of the first adjusted liquid pressure Pb related to the front wheels WHf is prioritized over the control of the second adjusted liquid pressure Pc related to the rear wheels WHr.

<Transition Example of Braking Force in Second Calculation Processing Example>

Figure 7:
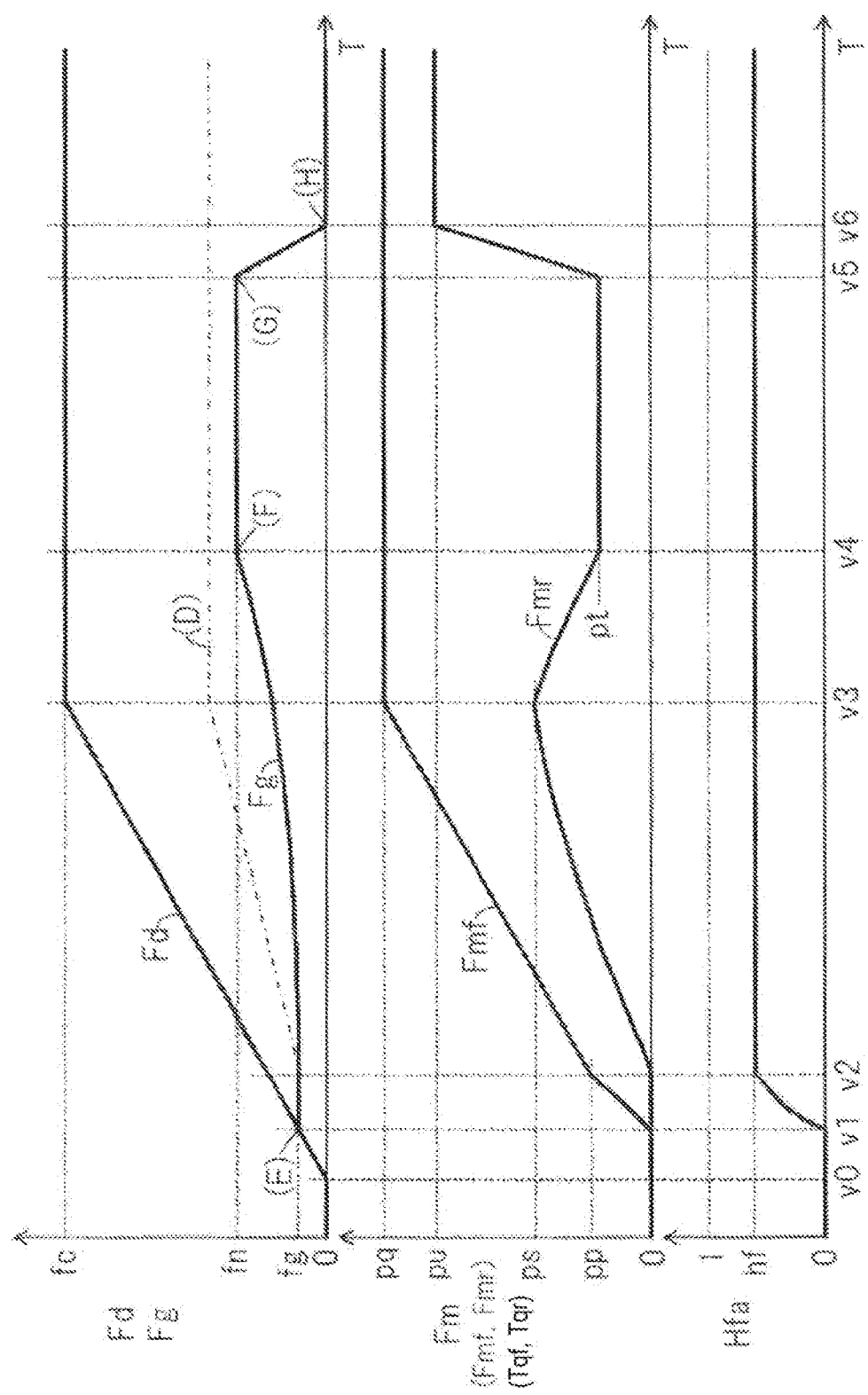
FIG. 7 is a time-series diagram describing a transition example of the braking force F corresponding to a second processing example.

A transition example of the braking force F corresponding to the second processing example will be described with reference to the time-series diagram of FIG. 7. In the second processing example, the regenerative generator GN is provided on the rear wheels WHr, and the regenerative braking force Fg acts on the rear wheel WHr in addition to the friction braking force Fmr. Since the generator GN is not provided on the front wheels WHf, only the friction braking force Fmf acts on the front wheels WHf. Similar to the first transition example, a case is assumed where the driver operates the braking operation member BP at a constant operation speed, then keeps the braking operation member BP constant, and stops the vehicle. Furthermore, the front wheel ratio (front-rear ratio) Hf is set to a constant predetermined value (constant) hf set in advance (i.e., "Hf=hf"). In the time-series diagram, the component by the regenerative braking force Fg corresponds to "a portion sandwiched by the X axis and the curve EFGH of the regenerative braking force Fg", the component by the rear wheel friction braking force Fmr corresponds to "a portion sandwiched by the two-dot chain line (D) and the curve EFGH", and the component by the front wheel friction braking force Fmf corresponds to "a portion sandwiched by the required braking force Fd and the two-dot chain line (D)".

At time v0, the operation of the braking operation member BP is started, the operation amount Ba is increased from "0", and the increase in the required braking force Fd is started. At the beginning of braking (between time v0 and time v1), "Fd≤Fx", and thus "Fg=Fd, Fmf=Fmr=0 (process of S370)" is determined, and the front wheel and rear wheel braking liquid pressures Pwf, Pwr (i.e., front wheel and rear wheel torques Tqf, Tqr) are set to "0". That is, the friction braking force Fm is not generated, and the vehicle is decelerated only by the regenerative braking force Fg. That is, when the regenerative braking force Fg generated by the regenerative generator GN has not reached the maximum regenerative force Fx (maximum braking force that can be generated) (i.e., when "Fg<Fx"), the front wheel torque Tqf and the rear wheel torque Tqr are determined to be "0 (zero)". At this time, the actual front wheel ratio Hfa is "0" and the rear wheel ratio Hra is "1".

At time v1, "Fd=Fx", and thereafter "Fd>Fx", so that "Fg=Fx (process of S380)" is determined. Furthermore, since "Fh≤Ft (=Hf×Fd)", "Fmf=Fh, Fmr=0 (process of S400)" is calculated. Therefore, the front wheel target liquid pressure Ptf is increased while the rear wheel target liquid pressure Ptr remains at "0". That is, when the regenerative braking force Fg reaches the maximum regenerative force Fx, the front wheel torque Tqf is rapidly increased from "0" before the rear wheel torque Tqr is increased from "0". Since the increase in the required braking force Fd is complemented only by the front wheel torque Tqf, the actual front wheel ratio Hfa including the regenerative braking force Fg can be rapidly increased (adjusted) from "0" toward the set value (constant) hf.

At time v2, "Fh=Ft", and thereafter "Fh>Ft", so that "Fg=Fx, Fmf=Ft, Fmr=Fq (processes of S380, S410)" is calculated. Therefore, the increase in the front wheel target liquid pressure Ptf is continued and the increase in the rear wheel target liquid pressure Ptr is started. As a result, the rear wheel torque Tqr is increased from "0", and the increasing gradient of the front wheel torque Tqf is decreased as compared with the case of "Fh≤Ft", and the front wheel torque Tqf is continuously increased. Therefore, the front wheel ratio Hfa can be reliably maintained at the target set ratio hf.

At time v3, the braking operation amount Ba is held, and the required braking force Fd becomes constant at the value fc. Even if the required braking force Fd is constant, the maximum regenerative force Fx is increased and the regenerative braking force Fg is increased according to the vehicle deceleration. From time v3, the rear wheel friction braking force Fmr (i.e., the rear wheel torque Tqr) is adjusted to decrease so that change in the regenerative braking force Fg is compensated, and the front wheel ratio Hfa is maintained at the target value hf. At this time, the front wheel friction braking force Fmf is maintained at the value mb (=Ft). At time v4, the vehicle body speed Vx becomes the predetermined speed vp, and the regenerative braking force Fg (=Fx) reaches the upper limit value fx. From time v4, the required braking force Fd and the regenerative braking force Fg are constant, and thus the rear wheel friction braking force Fmr is maintained at the value pt while the front wheel friction braking force Fmf is maintained at the value pq.

At time v5, the vehicle body speed Vx reaches the predetermined speed vo, and the maximum regenerative force Fx decreases. That is, at time v5, the switching operation between regenerative braking and friction braking is started. At this time, the front wheel friction braking force Fmf is made constant, and the decrease in the regenerative braking force Fg is compensated by the rear wheel friction braking force Fmr. After the rear wheel friction braking force Fmr reached the front wheel reference force Ft (=pu), the front wheel friction braking force Fmf is also held constant. Since the fluctuation of the regenerative braking force Fg is adjusted by the rear wheel friction braking force Fmr, the front wheel ratio Hfa can be maintained at the target ratio hf.

Similar to the first embodiment, the second embodiment also has the following effects. When the required braking force Fd can be achieved only by the regenerative braking force Fg, the front wheel and rear wheel torques Tqf and Tqr are set to "0", and the friction braking force is not generated, and thus the energy regeneration by the generator GN can be maximized. When the required braking force Fd cannot be achieved only by the regenerative braking force Fg, the front wheel torque Tqf is increased to a value corresponding to the front wheel reference force Ft (the front wheel braking force in which the distribution ratio hf of the braking force is taken into consideration) while the rear wheel torque Tqr is maintained at "0". Therefore, the desired front-rear ratio hf can be quickly achieved. After the ratio hf is achieved, the rear wheel torque Tqr is increased, the increasing gradient of the front wheel torque Tqf is decreased, and then the increase of the front wheel torque Tqf is continued. Therefore, the desired distribution ratio hf can be suitably maintained.

As mentioned in the other transition examples described above, the regenerative braking force Fg increases with decrease in the vehicle body speed Vx, and when the increase in the regenerative braking force Fg cannot be compensated only by the rear wheel friction braking force Fmr (rear wheel torque Tqr), it can be adjusted by decreasing the front wheel friction braking force Fmf (front wheel torque Tqf). Alternatively, the regenerative braking force Fg may be adjusted to be smaller than the maximum regenerative force Fx so as to achieve the required braking force Fd.

<Operation/Effect>

The operations and effects of the braking control device SC according to the present invention will be summarized.

The braking control device SC is provided in a vehicle having a regenerative generator GN on the front wheels WHf. The braking control device SC includes an actuator YU that applies the front wheel torque Tqf and the rear wheel torque Tqr, and a controller ECU that controls the actuator YU and adjusts the front wheel torque Tqf and the rear wheel torque Tqr. Here, the front wheel friction braking force Fmf is generated by the front wheel torque Tqf. Furthermore, the rear wheel friction braking force Fmr is generated by the rear wheel torque Tqr. When the regenerative braking force Fg generated by the regenerative generator GN has not reached the maximum regenerative force Fx that can be generated (i.e., when "Fg<Fx"), the front wheel torque Tqf and the rear wheel torque Tqr are determined to be "0 (zero)". On the other hand, when the regenerative braking force Fg reaches the maximum regenerative force Fx, the rear wheel torque Tqr is increased from "0" before the front wheel torque Tqf is increased from "0".

For example, when the regenerative braking force Fg reaches the maximum regenerative force Fx, the rear wheel reference force Fs is calculated based on the required braking force Fd corresponding to the braking operation amount Ba of the vehicle and the front-rear ratio Hr of the braking force acting on the vehicle (or the front-rear ratio Hf). At the same time, the complementary braking force Fh is calculated based on the required braking force Fd and the maximum regenerative force Fx. When the complementary braking force Fh is less than or equal to the rear wheel reference force Fs (i.e., when "Fh≤Fs"), the front wheel torque Tqf is maintained at "0" and the rear wheel torque Tqr is increased based on the complementary braking force Fh. On the other hand, when the complementary braking force Fh is larger than the rear wheel reference force Fs (i.e., when "Fh>Fs"), the front wheel torque Tqf is increased based on the complementary braking force Fh and the rear wheel reference force Fs, and the rear wheel torque Tqr is increased based on the rear wheel reference force Fs.

In the case of "Fg<Fx", the front wheel torque Tqf and the rear wheel torque Tqr are set to "0", and thus the maximum energy can be regenerated. When "Fg≥Fx", the increase of the rear wheel torque Tqr is started before the front wheel torque Tqf starts to increase, and thus the desired front-rear distribution ratio Hr of the braking force can be reached in a short time. In addition, after the desired distribution ratio Hr is achieved, the front wheel torque Tqf is increased based on the complementary braking force Fh and the rear wheel reference force Fs, and the rear wheel torque Tqr is increased based on the rear wheel reference force Fs, so that the distribution ratio Hf can be reliably maintained.

The braking control device SC is provided in a vehicle having a regenerative generator GN on the rear wheels WHr. In the braking control device SC, when the regenerative braking force Fg has not reached the maximum regenerative force Fx, the front wheel torque Tqf and the rear wheel torque Tqr are determined to be "0 (zero)". On the other hand, when the regenerative braking force Fg reaches the maximum regenerative force Fx, the front wheel torque Tqf is increased from "0" before the rear wheel torque Tqr is increased from "0".

For example, when the regenerative braking force Fg reaches the maximum regenerative force Fx, the front wheel reference force Ft is calculated based on the required braking force Fd corresponding to the braking operation amount Ba and the front-rear ratio Hf (or the front-rear ratio Hr) of the braking force acting on the vehicle. At the same time, the complementary braking force Fh is calculated based on the required braking force Fd and the maximum regenerative force Fx. When the complementary braking force Fh is less than or equal to the front wheel reference force Ft, the rear wheel torque Tqr is maintained at "0" and the front wheel torque Tqf is increased based on the complementary braking force Fh. On the other hand, when the complementary braking force Fh is larger than the front wheel reference force Ft, the front wheel torque Tqf is increased based on the front wheel reference force Ft. Furthermore, the rear wheel torque Tqr is increased based on the complementary braking force Fh and the front wheel reference force Ft.

Similar to the above, in the case of "Fg<Fx", the front wheel torque Tqf and the rear wheel torque Tqr are set to "0", and thus the regeneration amount of the energy can be maximized. When "Fg≥Fx", the increase of the front wheel torque Tqf is started before the increase of the rear wheel torque Tqr is started, so that the desired front-rear distribution ratio Hf of the braking force can be instantaneously achieved. In addition, after the desired distribution ratio Hf is achieved, the front wheel torque Tqf is increased based on the front wheel reference force Ft, and the rear wheel torque Tqr is increased based on the complementary braking force Fh and the front wheel reference force Ft, so that the distribution ratio Hf can be reliably maintained.

Other Embodiments

Other embodiments will be described below. In other embodiments, similar effects as described above (maximization of regenerative energy and rapid achievement and maintenance of desired front-rear distribution ratios Hf and Hr) are achieved.

In the embodiments described above, the rear wheel reference force Fs is calculated based on the rear wheel ratio Hr, and the front wheel reference force Ft is calculated based on the front wheel ratio Hf. However, due to the relationship of "Hf+Hr=1", the rear wheel reference force Fs may be calculated based on the front wheel ratio Hf, or the front wheel reference force Ft may be calculated based on the rear wheel ratio Hr. Specifically, the required braking force Fd is multiplied by "1−Hf" to calculate the rear wheel reference force Fs. Furthermore, the required braking force Fd is multiplied by "1−Hr" to calculate the front wheel reference force Ft. Therefore, the rear wheel reference force Fs and the front wheel reference force Ft are calculated based on the distribution ratios Hf and Hr (the front-rear ratio of the braking force acting on the vehicle).

In the embodiments described above, the linear type pressure adjusting valves UB, UC are employed in which the valve opening amount is adjusted in accordance with the energization amount. For example, although the pressure adjusting valves UB, UC are on/off valves, the opening and closing of the valves may be controlled by a duty ratio and the liquid pressure may be linearly controlled.

In the embodiments described above, the configuration of the disc type braking device (disc brake) has been exemplified. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiments described above, the liquid pressure type braking control device SC in which the braking torques Tqf and Tqr are adjusted by the brake fluid BF has been illustrated. Instead, an electric braking control device SC that does not use the brake fluid BF is employed. In this device, the rotation of the electric motor is converted into linear power by a screw mechanism or the like, and the friction member is pressed against the rotating member KT. In this case, the braking torques Tqf, Tqr are generated by the pressing force of the friction member with respect to the rotating member KT generated by using the electric motor as a power source instead of the braking liquid pressure Pw. Furthermore, the liquid pressure type and the electric type may be combined.

In the embodiments described above, the first and second adjusted liquid pressure sensors PB and PC are provided in the pressure adjusting fluid passage HC so as to detect the first and second adjusted liquid pressures Pb and Pc. A master liquid pressure sensor PQ may be used instead of the first and second adjusted liquid pressure sensors PB and PC. Specifically, in the first embodiment, the second adjusted liquid pressure sensor PC is omitted, and the actual second adjusted liquid pressure Pc can be calculated based on the detected value Pm of the master liquid pressure sensor PQ. Furthermore, in the second embodiment, the first adjusted liquid pressure sensor PB is omitted, and the actual first adjusted liquid pressure Pb can be calculated based on the detected value Pm of the master liquid pressure. This is because the specifications of the master piston PM and the master cylinder CM are known. For example, when the pressure receiving area rs of the servo chamber Rs and the pressure receiving area rm of the master chamber Rm are equal, the relationship of "Pm=Pc" or "Pm=Pb" is established.

The invention claimed is:

1. A braking control device for a vehicle in which a regenerative generator is provided on a front wheel of the vehicle, the braking control device for the vehicle comprising:
   an actuator that causes a front wheel torque to be applied to the front wheel to generate a front wheel friction braking force and a rear wheel torque to be applied to a rear wheel of the vehicle to generate a rear wheel friction braking force, and
   a controller that controls the actuator and individually adjusts the front wheel torque and the rear wheel torque, wherein
   the controller is configured to
      determine the front wheel torque and the rear wheel torque to be zero when a regenerative braking force generated by the regenerative generator has not reached a maximum regenerative force which is a generatable maximum value,
      increase the rear wheel torque from zero before increasing the front wheel torque from zero when the regenerative braking force reaches the maximum regenerative force,
      when the regenerative braking force reaches the maximum regenerative force,
         calculate a rear wheel reference force based on a required braking force corresponding to a braking operation amount of the vehicle and a front-rear ratio of a braking force acting on the vehicle, and
         calculate a complementary braking force based on the required braking force and the maximum regenerative force,
      when the complementary braking force is less than or equal to the rear wheel reference force, maintain the front wheel torque at zero and increase the rear wheel torque based on the complementary braking force, and
      when the complementary braking force is larger than the rear wheel reference force, increase the front wheel torque based on the complementary braking force and the rear wheel reference force, and increase the rear wheel torque based on the rear wheel reference force.

2. A braking control device for a vehicle in which a regenerative generator is provided on a rear wheel of the vehicle, the braking control device for the vehicle comprising:
   an actuator that causes a front wheel torque to be applied to a front wheel of the vehicle to generate a front wheel friction braking force and a rear wheel torque to be applied to the rear wheel to generate a rear wheel friction braking force, and
   a controller that controls the actuator and individually adjusts the front wheel torque and the rear wheel torque, wherein
   the controller is configured to
      determine the front wheel torque and the rear wheel torque to be zero when a regenerative braking force generated by the regenerative generator has not reached a maximum regenerative force which is a generatable maximum value,
      increase the front wheel torque from zero before increasing the rear wheel torque from zero when the regenerative braking force reaches the maximum regenerative force,
      when the regenerative braking force reaches the maximum regenerative force,
         calculate a front wheel reference force based on a required braking force corresponding to a braking operation amount of the vehicle and a front-rear ratio of a braking force acting on the vehicle, and
         calculate a complementary braking force based on the required braking force and the maximum regenerative force,
      when the complementary braking force is less than or equal to the front wheel reference force, maintain the rear wheel torque at zero and increase the front wheel torque based on the complementary braking force, and when the complementary braking force is larger than the front wheel reference force, increase the front wheel torque based on the front wheel reference force, and increase the rear wheel torque based on the complementary braking force and the front wheel reference force.

* * * * *